(12) United States Patent
Guo et al.

(10) Patent No.: US 10,433,301 B2
(45) Date of Patent: Oct. 1, 2019

(54) METHOD AND APPARATUS FOR HANDLING TIMING ADVANCE FOR UPLINK TRANSMISSION IN A WIRELESS COMMUNICATION SYSTEM

(71) Applicant: ASUSTek Computer Inc., Taipei (TW)

(72) Inventors: Yu-Hsuan Guo, Taipei (TW); Hsin-Hsi Tsai, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/694,437

(22) Filed: Sep. 1, 2017

(65) Prior Publication Data
US 2018/0084546 A1  Mar. 22, 2018

Related U.S. Application Data

(60) Provisional application No. 62/396,652, filed on Sep. 19, 2016, provisional application No. 62/396,686, filed on Sep. 19, 2016.

(51) Int. Cl.
*H04W 72/04* (2009.01)
*H04W 72/12* (2009.01)
(Continued)

(52) U.S. Cl.
CPC ... *H04W 72/0446* (2013.01); *H04W 56/0015* (2013.01); *H04W 56/0045* (2013.01); *H04W 72/042* (2013.01); *H04W 72/1268* (2013.01); *H04L 1/1812* (2013.01); *H04W 76/27* (2018.02); *H04W 88/02* (2013.01)

(58) Field of Classification Search
CPC .......... H04W 56/0015; H04W 72/042; H04W 72/0446; H04W 76/27; H04W 88/02
See application file for complete search history.

(56) References Cited

U.S. PATENT DOCUMENTS 8,958,412 B2   2/2015   Singh et al.
9,167,597 B2   10/2015  Singh et al.
(Continued)

FOREIGN PATENT DOCUMENTS

WO   2008024788   2/2008
WO   2013006111   1/2013

OTHER PUBLICATIONS

European Search Report from corresponding EP Application No. 17189079.1, dated Feb. 13, 2018.

*Primary Examiner* — Mewale A Ambaye
(74) *Attorney, Agent, or Firm* — Blue Capital Law Firm, P.C.

(57) ABSTRACT

A method and apparatus are disclosed, from the perspective of the UE (User Equipment). In one embodiment, the method includes maintaining a first timing advance value for uplink transmissions. In addition, the method includes receiving a signaling, via a downlink control channel, to schedule a first uplink transmission in a cell, wherein the signaling includes a first information to assist the UE to determine a specific timing advance value for the first uplink transmission, and the first information indicates an index value used to control an amount of timing adjustment to be applied. The method also includes performing the first uplink transmission in the cell at transmission timing determined at least based on the specific timing advance value.

20 Claims, 33 Drawing Sheets

(51) Int. Cl.
  *H04W 56/00*   (2009.01)
  *H04W 76/27*   (2018.01)
  *H04L 1/18*    (2006.01)
  *H04W 88/02*   (2009.01)

(56) References Cited

U.S. PATENT DOCUMENTS

| | | |
|---|---|---|
| 9,467,959 B2 | 10/2016 | Chen et al. |
| 2009/0111445 A1 | 4/2009 | Ratasuk |
| 2013/0028185 A1 | 1/2013 | Wu |
| 2013/0142113 A1* | 6/2013 | Fong ............... H04W 4/70 370/328 |
| 2014/0204919 A1 | 7/2014 | Chen et al. |
| 2016/0227502 A1* | 8/2016 | Vos ............... H04W 56/0015 |
| 2016/0227504 A1 | 8/2016 | Etemad et al. |
| 2018/0084546 A1* | 3/2018 | Guo ............... H04W 72/042 |
| 2018/0302915 A1* | 10/2018 | Einhaus ........... H04W 72/1215 |

\* cited by examiner

Analog beam (Total: 4, concurrently: 2)
{a, b, c, d}

Hybrid beam (Total: 8, concurrently: 4)
{1, 2, 3, 4, 5, 6, 7, 8}

Possible combinations

METHOD AND APPARATUS FOR HANDLING TIMING ADVANCE FOR UPLINK TRANSMISSION IN A WIRELESS COMMUNICATION SYSTEM

CROSS-REFERENCE TO RELATED APPLICATIONS

The present application claims the benefit of U.S. Provisional Patent Application Ser. Nos. 62/396,652 and 62/396,686 filed on Sep. 19, 2016, the entire disclosures of which are incorporated herein in their entirety by reference.

FIELD

This disclosure generally relates to wireless communication networks, and more particularly, to a method and apparatus for handling timing advance for uplink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed, from the perspective of the UE (User Equipment). In one embodiment, the method includes maintaining a first timing advance value for uplink transmissions. In addition, the method includes receiving a signaling, via a downlink control channel, to schedule a first uplink transmission in a cell, wherein the signaling includes a first information to assist the UE to determine a specific timing advance value for the first uplink transmission, and the first information indicates an index value used to control an amount of timing adjustment to be applied. The method also includes performing the first uplink transmission in the cell at transmission timing determined at least based on the specific timing advance value.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 v0.1.0, "Study on New Radio Access Technology; Radio Access Architecture and Interfaces."; R2-164306, "Summary of email discussion [93bis#23][NR] Deployment scenarios", NTT DOCOMO; 3GPP RAN2#94 meeting minutes; R2-163879, "RAN2 Impacts in HF-NR", MediaTeK; R2-162210, "Beam level management<->Cell level mobility", Samsung; R2-163471, "Cell concept in NR", CATT; R2-164270, "General considerations on LTE-NR tight interworking", Huawei; R2-162251, "RAN2 aspects of high frequency New RAT", Samsung; R1-165364, "Support for Beam Based Common Control Plane", Nokia and Alcatel-Lucent Shanghai Bell; TS 36.321 V13.2.0, "Medium Access Control (MAC) protocol specification"; TS 36.300 v13.4.0, "E-UTRA and E-UTRAN; Overall description; Stage 2"; TS 36.213 v13.2.0, "E-UTRA; Physical layer procedures"; and TS 36.214 v13.2.0, "E-UTRA; Physical Layer; Measurements". The standards and documents listed above are hereby expressly incorporated by reference in their entirety.

Figure 1:
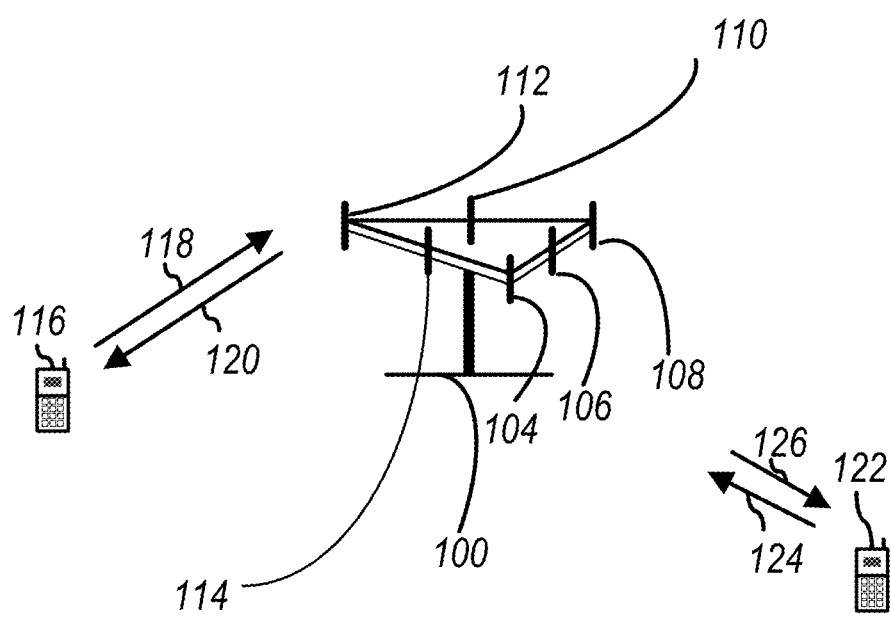
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
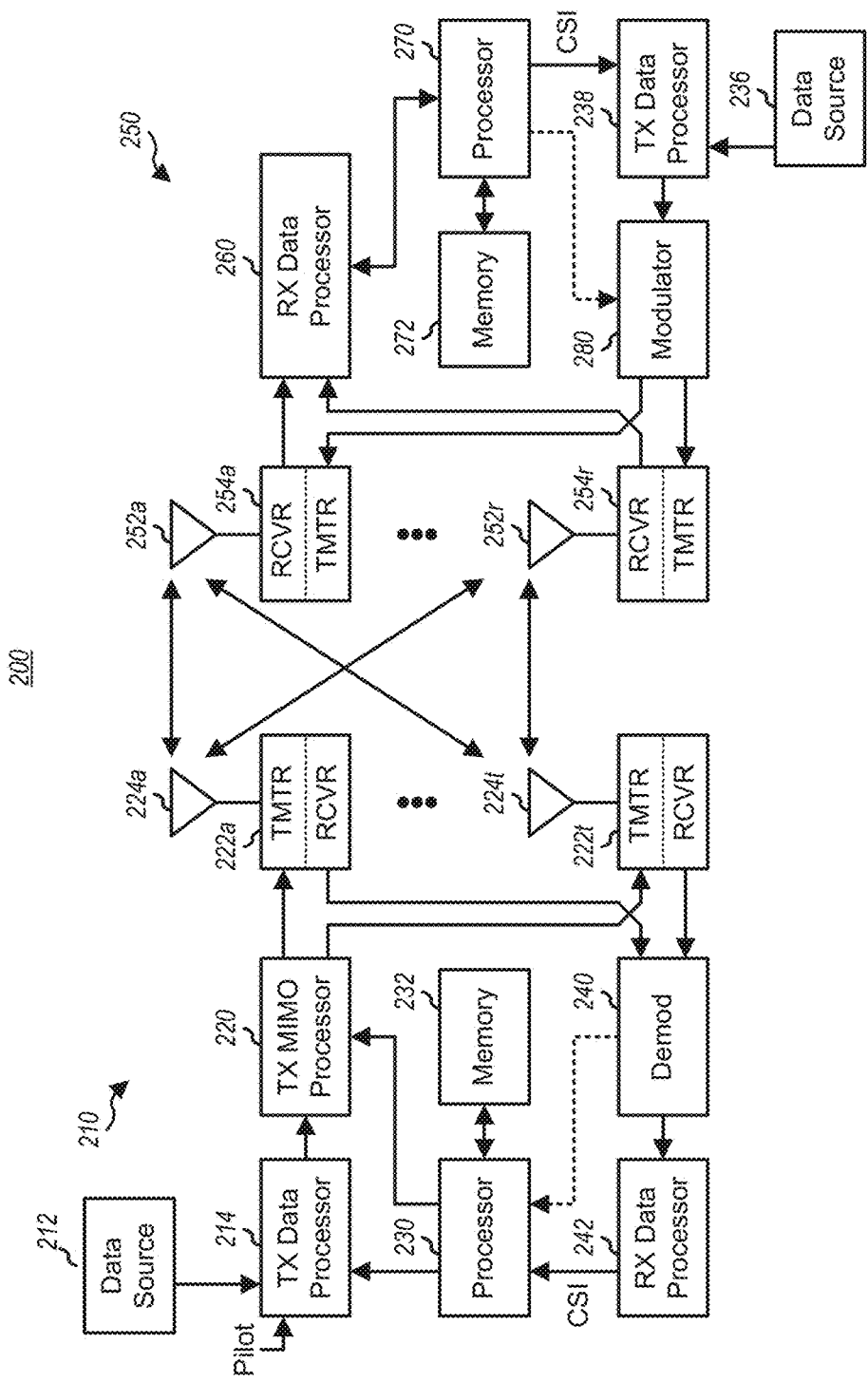
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
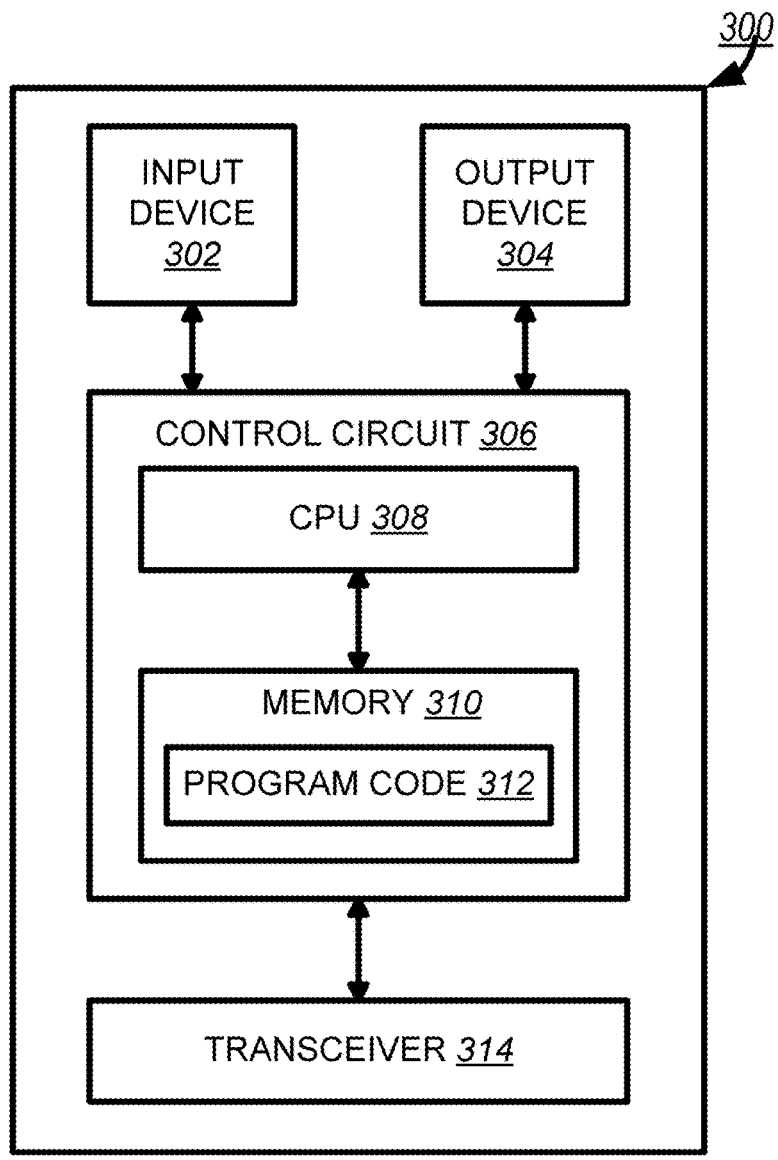
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
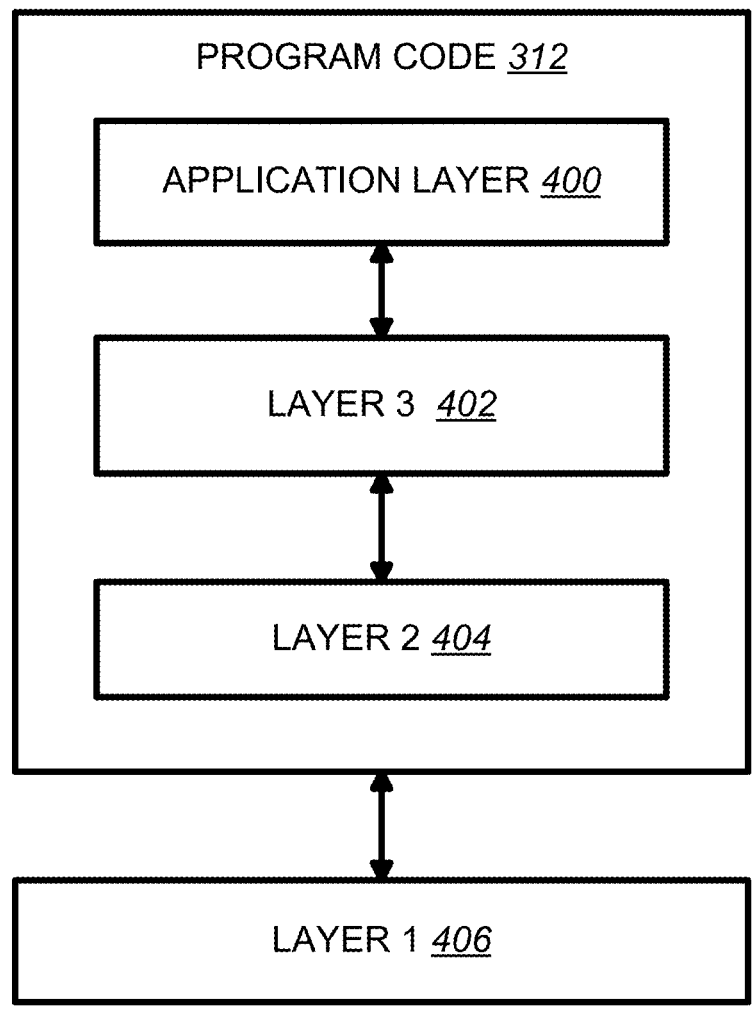
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:
eMBB (enhanced Mobile Broadband)
mMTC (massive Machine Type Communications)
URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Figure 5:
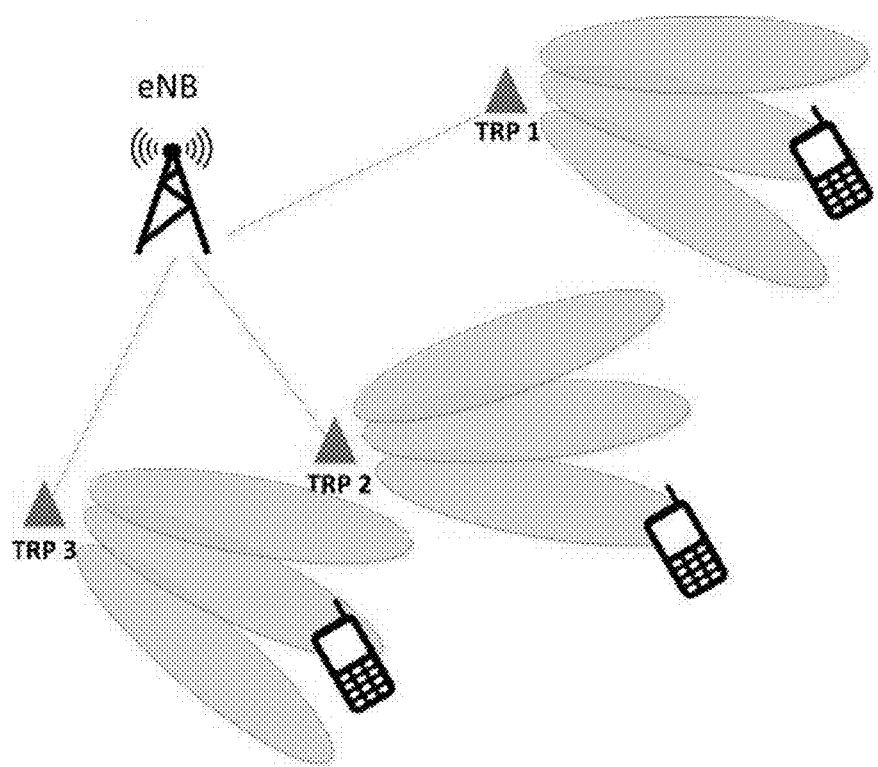
FIG. 5 is a diagram according to one exemplary embodiment.

Based on 3GPP R2-162709 and as shown in FIG. 5, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:
Intra-TRP mobility
Inter-TRP mobility
Inter-NR eNB mobility Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

In LTE, according Section 5.2.7.3 (entitled "Uplink timing control") of 3GPP TS 36.300, network could estimate the uplink signal arrival time which can be used to calculate the required timing advance value and adjust the uplink transmission timing by sending the value of timing advance to the respective UE. Timing advance value is a negative offset, between the start of a received downlink subframe and a transmitted uplink subframe at the UE. This offset at the UE is necessary to ensure that the downlink and uplink subframes are synchronized at the network.

5.2.7.3 Uplink Timing Control

The timing advance is derived from the UL received timing and sent by the eNB to the UE which the UE uses to advance/delay its timings of transmissions to the eNB so as to compensate for propagation delay and thus time align the transmissions from different UEs with the receiver window of the eNB.

The timing advance command for each TAG is on a per need basis with a granularity in the step size of 0.52 µs ($16 \times T_s$).

In addition, a general description about timing advance in LTE is specified in the section 10.1.2.7 (entitled "Timing Advance") as follows:

10.1.2.7 Timing Advance

In RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). Each TAG contains at least one serving cell with configured uplink, and the mapping of each serving cell to a TAG is configured by RRC. In case of DC, a TAG only includes cells that are associated to the same CG and the maximum number of TAG is 8.

For the pTAG the UE uses the PCell in MCG and the PSCell in SCG as timing reference. In a STAG, the UE may use any of the activated SCells of this TAG as a timing reference cell, but should not change it unless necessary.

In some cases (e.g. during DRX), the timing advance is not necessarily always maintained and the MAC sublayer knows if the L1 is synchronised and which procedure to use to start transmitting in the uplink:

as long as the L1 is non-synchronised, uplink transmission can only take place on PRACH.

For a TAG, cases where the UL synchronisation status moves from "synchronised" to "non-synchronised" include:

Expiration of a timer specific to the TAG;
Non-synchronised handover.

The synchronisation status of the UE follows the synchronisation status of the pTAG of MCG. The synchronisation status of the UE w.r.t. SCG follows the synchronisation status of the pTAG of SCG. When the timer associated with pTAG is not running, the timer associated with an sTAG in that CG shall not be running. Expiry of the timers associated with one CG does not affect the operation of the other CG. The value of the timer associated to the pTAG of MCG is either UE specific and managed through dedicated signalling between the UE and the eNB, or cell specific and indicated via broadcast information. In both cases, the timer is normally restarted whenever a new timing advance is given by the eNB for the pTAG:

restarted to a UE specific value if any; or
restarted to a cell specific value otherwise.

The value of the timer associated to a pTAG of SCG and the value of a timer associated to an sTAG of an MCG or an sTAG of SCG are managed through dedicated signalling between the UE and the eNB, and the timers associated to these TAGs can be configured with different values. The timers of these TAGs are normally restarted whenever a new timing advance is given by the eNB for the corresponding TAG.

Upon DL data arrival or for positioning purpose, a dedicated signature on PRACH can be allocated by the eNB to the UE. When a dedicated signature on PRACH is allocated, the UE shall perform the corresponding random access procedure regardless of its L1 synchronisation status.

Timing advance updates are signalled by the eNB to the UE in MAC PDUs.

In LTE, the MAC specification (3GPP TS 36.321) depicts the mechanism of maintaining UL timing advance for UE, and identifies the format of Timing Advance Command MAC Control Element and Random Access Response MAC Control Element. Two distinct types of Timing advance with different length are introduced, the one is absolute TA (11 bits), and the other is relative TA (6 bits). Absolute TA is included in Random Access Response MAC Control Element which could be used to indicate the initial/exact TA value. Relative TA is included in Timing Advance Command MAC Control Element which is utilized to adjust TA value.

Section 5.2 of 3GPP TS 36.321 specifies the maintenance of uplink timing alignment as follows:

5.2 Maintenance of Uplink Time Alignment

The MAC entity has a configurable timer timeAlignmentTimer per TAG. The timeAlignmentTimer is used to control how long the MAC entity considers the Serving Cells belonging to the associated TAG to be uplink time aligned [8].

The MAC entity shall:
 when a Timing Advance Command MAC control element is received:
  apply the Timing Advance Command for the indicated TAG;
  start or restart the timeAlignmentTimer associated with the indicated TAG.
 when a Timing Advance Command is received in a Random Access Response message for a serving cell belonging to a TAG:
  if the Random Access Preamble was not selected by the MAC entity:
   apply the Timing Advance Command for this TAG;
   start or restart the timeAlignmentTimer associated with this TAG.
  else, if the timeAlignmentTimer associated with this TAG is not running:
   apply the Timing Advance Command for this TAG;
   start the timeAlignmentTimer associated with this TAG;
   when the contention resolution is considered not successful as described in subclause 5.1.5, stop timeAlignmentTimer associated with this TAG.
  else:
   ignore the received Timing Advance Command.
 when a timeAlignmentTimer expires:
  if the timeAlignmentTimer is associated with the pTAG:

flush all HARQ buffers for all serving cells;
notify RRC to release PUCCH for all serving cells;
notify RRC to release SRS for all serving cells;
clear any configured downlink assignments and uplink grants;
consider all running timeAlignmentTimers as expired;
else if the timeAlignmentTimer is associated with an STAG, then for all Serving Cells belonging to this TAG:
flush all HARQ buffers;
notify RRC to release SRS;
notify RRC to release PUCCH, if configured.

When the MAC entity stops uplink transmissions for an SCell due to the fact that the maximum uplink transmission timing difference (as described in subclause 7.9.2 of TS 36.133 [9]) or the maximum uplink transmission timing difference the UE can handle between TAGs of any MAC entity of the UE is exceeded, the MAC entity considers the timeAlignmentTimer associated with the SCell as expired. The MAC entity shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity shall not perform any uplink transmission on any Serving Cell except the Random Access Preamble transmission on the SpCell.

The MAC entity shall not perform any sidelink transmission which is performed based on UL timing of the corresponding serving cell and any associated SCI transmissions when the corresponding timeAlignmentTimer is not running.

NOTE: A MAC entity stores or maintains $N_{TA}$ upon expiry of associated timeAlignmentTimer, where $N_{TA}$ is defined in [7]. The MAC entity applies a received Timing Advance Command MAC control element and starts associated timeAlignmentTimer also when the timeAlignmentTimer is not running.

In addition, LTE MAC discusses Timing Advance Command MAC Control Element in 3GPP TS 36.321 as follows:
6.1.3.5 Timing Advance Command MAC Control Element
The Timing Advance Command MAC control element is identified by MAC PDU subheader with LCID as specified in table 6.2.1-1.
It has a fixed size and consists of a single octet defined as follows (FIG. 6.1.3.5-1):
TAG Identity (TAG Id): This field indicates the TAG Identity of the addressed TAG. The TAG containing the SpCell has the TAG Identity 0. The length of the field is 2 bits;
Timing Advance Command: This field indicates the index value $T_A$ (0, 1, 2 . . . 63) used to control the amount of timing adjustment that MAC entity has to apply (see subclause 4.2.3 of [2]). The length of the field is 6 bits.
[FIG. 6.1.3.5-1 of 3GPP TS 321 v13.2.0, Entitled "Timing Advance Command MAC Control Element", is Reproduced as FIG. 6]

Figure 6:
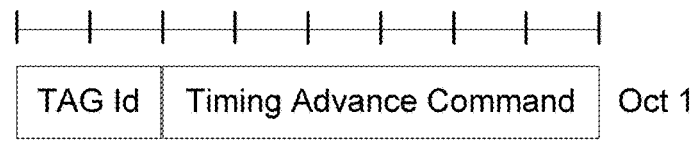
FIG. 6 is a reproduction of FIG. 6.1.3.5-1 of 3GPP TS 36.321 v13.2.0.
Figure 22:
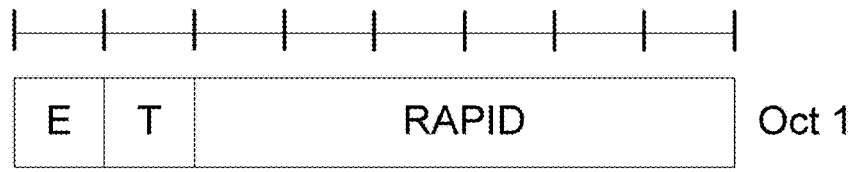
FIG. 22 is a reproduction of FIG. 6.1.5-1 of 3GPP TS 36.321 v13.2.0.
Figure 23:
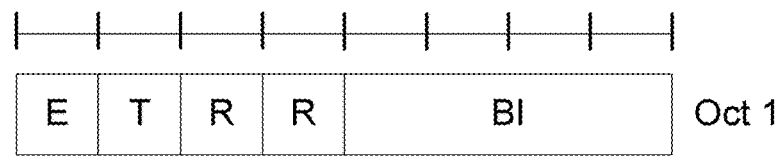
FIG. 23 is a reproduction of FIG. 6.1.5-2 of 3GPP TS 36.321 v13.2.0.
Figure 24:
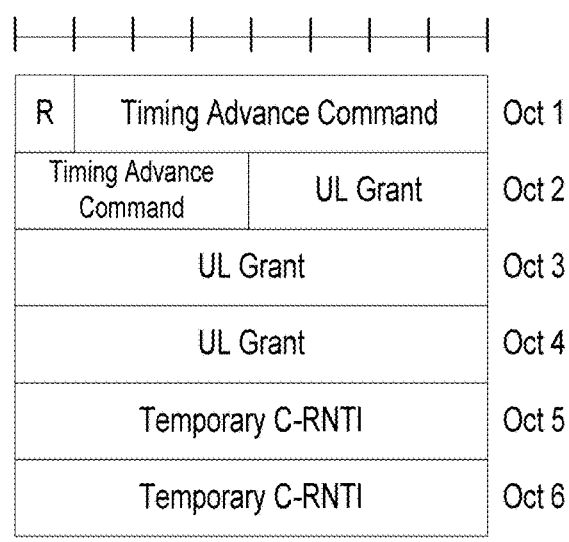
FIG. 24 is a reproduction of FIG. 6.1.5-3 of 3GPP TS 36.321 v13.2.0.
Figure 25:
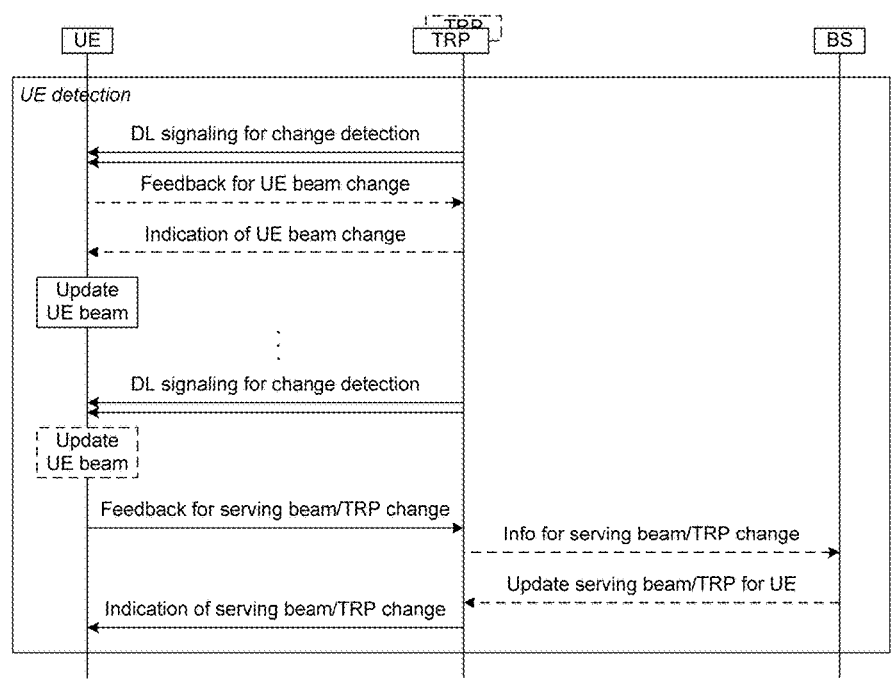
FIG. 25 is a message flow chart according to one exemplary embodiment.

In addition, LTE MAC discusses Random Access Response in 3GPP TS 36.321 as follows:
6.1.5 MAC PDU (Random Access Response)
A MAC PDU consists of a MAC header and zero or more MAC Random Access Responses (MAC RAR) and optionally padding as described in FIG. 6.1.5-4.
The MAC header is of variable size.
A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.
A MAC PDU subheader consists of the three header fields E/T/RAPID (as described in FIG. 6.1.5-1) but for the Backoff Indicator subheader which consists of the five header field E/T/R/R/BI (as described in FIG. 6.1.5-2).
A MAC RAR consists of the four fields R/Timing Advance Command/UL Grant/Temporary C-RNTI (as described in FIGS. 6.1.5-3 and 6.1.5-3a). For BL UEs and UEs in enhanced coverage in enhanced coverage level 2 or 3 (see subclause 6.2 in [2]) the MAC RAR in FIG. 6.1.5-3a is used, otherwise the MAC RAR in FIG. 6.1.5-3 is used.
Padding may occur after the last MAC RAR. Presence and length of padding is implicit based on TB size, size of MAC header and number of RARs.
[FIG. 6.1.5-1 of 3GPP TS 36.321 v13.2.0, entitled "E/T/RAPID MAC subheader", is reproduced as FIG. 22]
[FIG. 6.1.5-2 of 3GPP TS 36.321 v13.2.0, entitled "E/T/R/R/BI MAC subheader", is reproduced as FIG. 23]
[FIG. 6.1.5-3 of 3GPP TS 36.321 v13.2.0, entitled "MAC RAR", is reproduced as FIG. 24]

3GPP TS 36.213 specifies further information about timing adjustment as follows:
4.2.3 Transmission Timing Adjustments
Upon reception of a timing advance command for a TAG containing the primary cell, the UE shall adjust uplink transmission timing for PUCCH/PUSCH/SRS of the primary cell based on the received timing advance command. The UL transmission timing for PUSCH/SRS of a secondary cell is the same as the primary cell if the secondary cell and the primary cell belong to the same TAG.

Upon reception of a timing advance command for a TAG not containing the primary cell, the UE shall adjust uplink transmission timing for PUSCH/SRS of all the secondary cells in the TAG based on the received timing advance command where the UL transmission timing for PUSCH/SRS is the same for all the secondary cells in the TAG.

The timing advance command for a TAG indicates the change of the uplink timing relative to the current uplink timing for the TAG as multiples of $16T_s$. The start timing of the random access preamble is specified in [3].

In case of random access response, an 11-bit timing advance command [8], $T_A$, for a TAG indicates $N_{TA}$ values by index values of $T_A=0, 1, 2, \ldots, 1282$, where an amount of the time alignment for the TAG is given by $N_{TA}=T_A \times 16$. $N_{TA}$ is defined in [3].

In other cases, a 6-bit timing advance command [8], $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31) \times 16$. Here, adjustment of $N_{TA}$ value by a positive or a negative amount indicates advancing or delaying the uplink transmission timing for the TAG by a given amount respectively.

For a timing advance command received on subframe n, the corresponding adjustment of the uplink transmission timing shall apply from the beginning of subframe n+6. For serving cells in the same TAG, when the UE's uplink PUCCH/PUSCH/SRS transmissions in subframe n and subframe n+1 are overlapped due to the timing adjustment, the UE shall complete transmission of subframe n and not transmit the overlapped part of subframe n+1.

If the received downlink timing changes and is not compensated or is only partly compensated by the uplink timing adjustment without timing advance command as specified in [10], the UE changes $N_{TA}$ accordingly.

Figure 7:
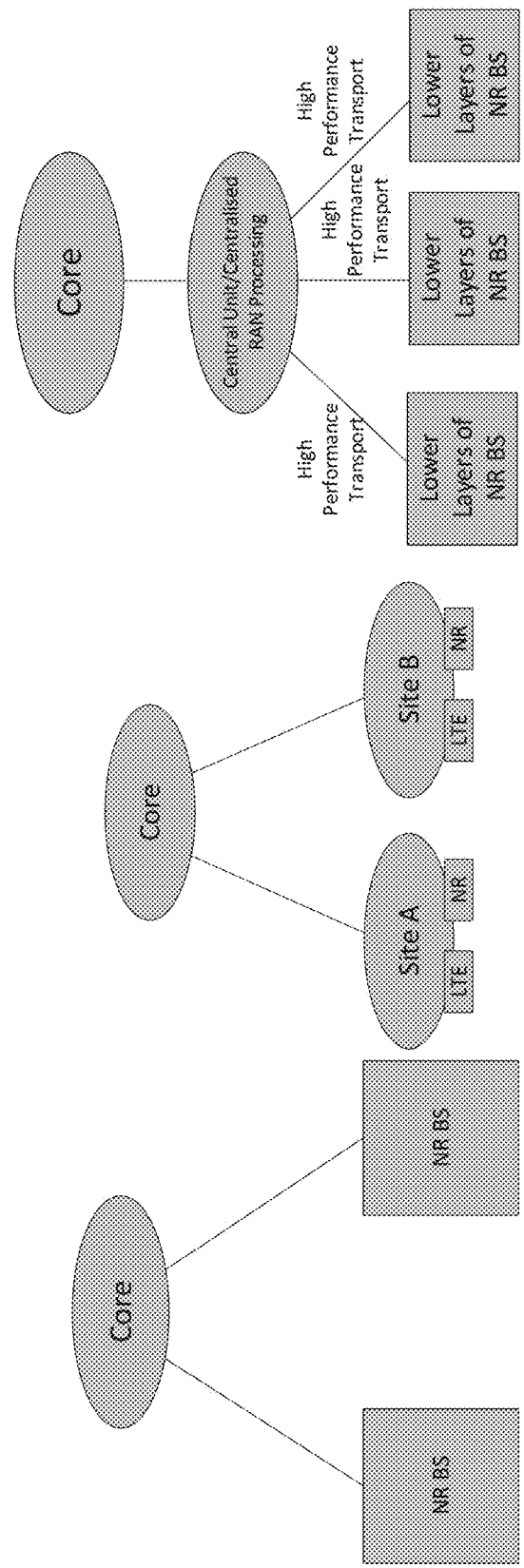
FIG. 7 is a diagram according to one exemplary embodiment.
Figure 8:
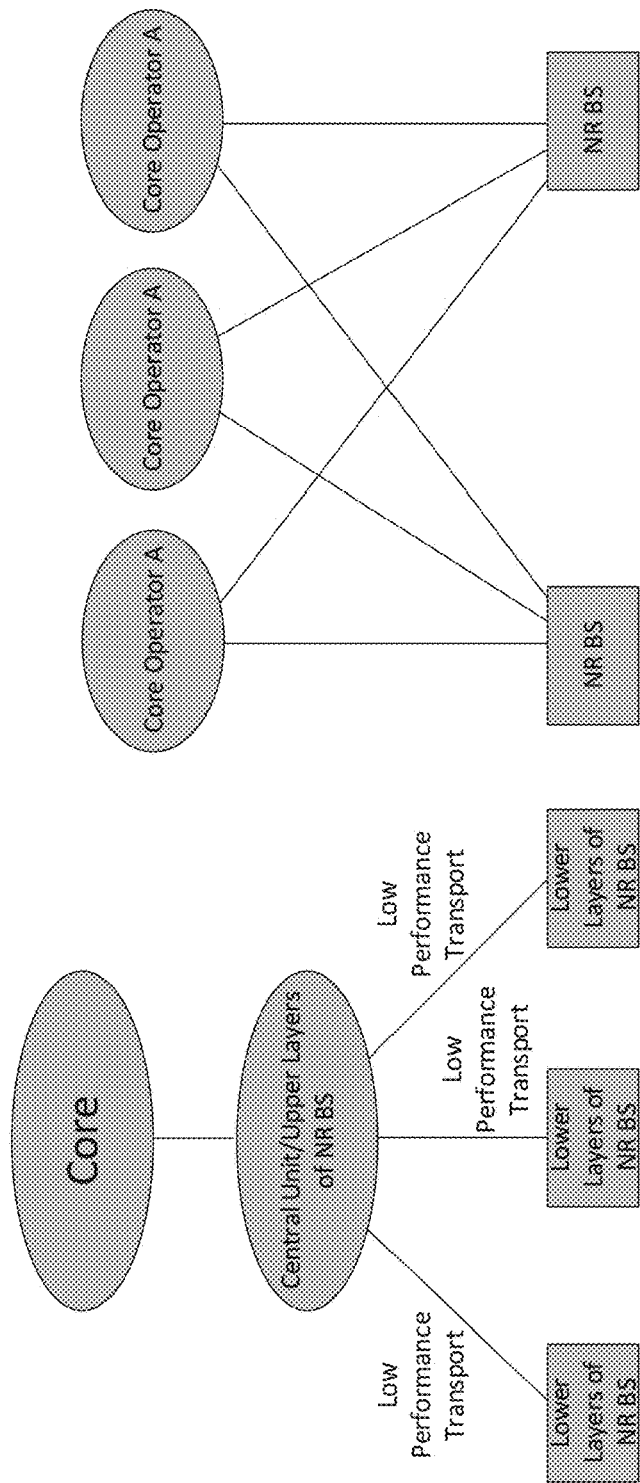
FIG. 8 is a diagram according to one exemplary embodiment.

Based on 3GPP R3-160947, the scenarios illustrated in FIGS. 7 and 8 should be considered for support by the NR radio network architecture.

Based on 3GPP R2-164306, the following scenarios in terms of cell layout for standalone NR are captured to be studied:
- Macro cell only deployment
- Heterogeneous deployment
- Small cell only deployment Based on 3GPP RAN2#94 meeting minutes, 1 NR eNB corresponds to 1 or many TRPs. Two levels of network controlled mobility:
- RRC driven at "cell" level.
- Zero/Minimum RRC involvement (e.g. at MAC/PHY)

Based on 3GPP R2-162210, in 5G the principle of 2-level mobility handling may possibly be kept:

A) Cell level mobility
 a. Cell selection/reselection in IDLE, handover in CONN
 b. Handled by RRC in CONN state
B) Beam level management
 a. L1 handles appropriate selection of the TRP to use for a UE and the optimal beam direction In general, 5G systems are expected to rely more heavily on "beam based mobility" to handle UE mobility, in addition to regular handover based UE mobility. Technologies like MIMO (Multiple Input Multiple Output), fronthauling, C-RAN (Cloud RAN), and NFV (Network Function Virtualization) will allow the coverage area controlled by one "5G Node" to grow, thus increasing the possibilities for beam level management and reducing the need for cell level mobility. The mobility within the coverage area of one 5G node could in theory be handled based on beam level management, which would leave handovers only to be used for mobility to the coverage area of another 5G Node.

Figure 9:
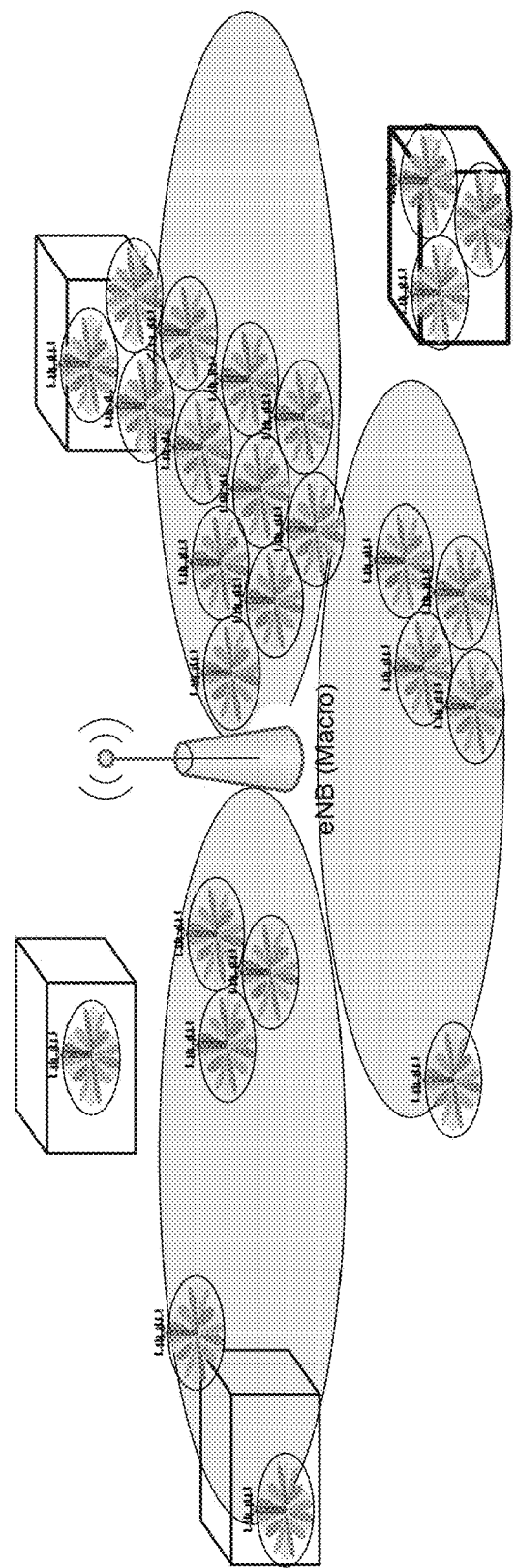
FIG. 9 illustrates a deployment with single TRP cell according to one exemplary embodiment.
Figure 10:
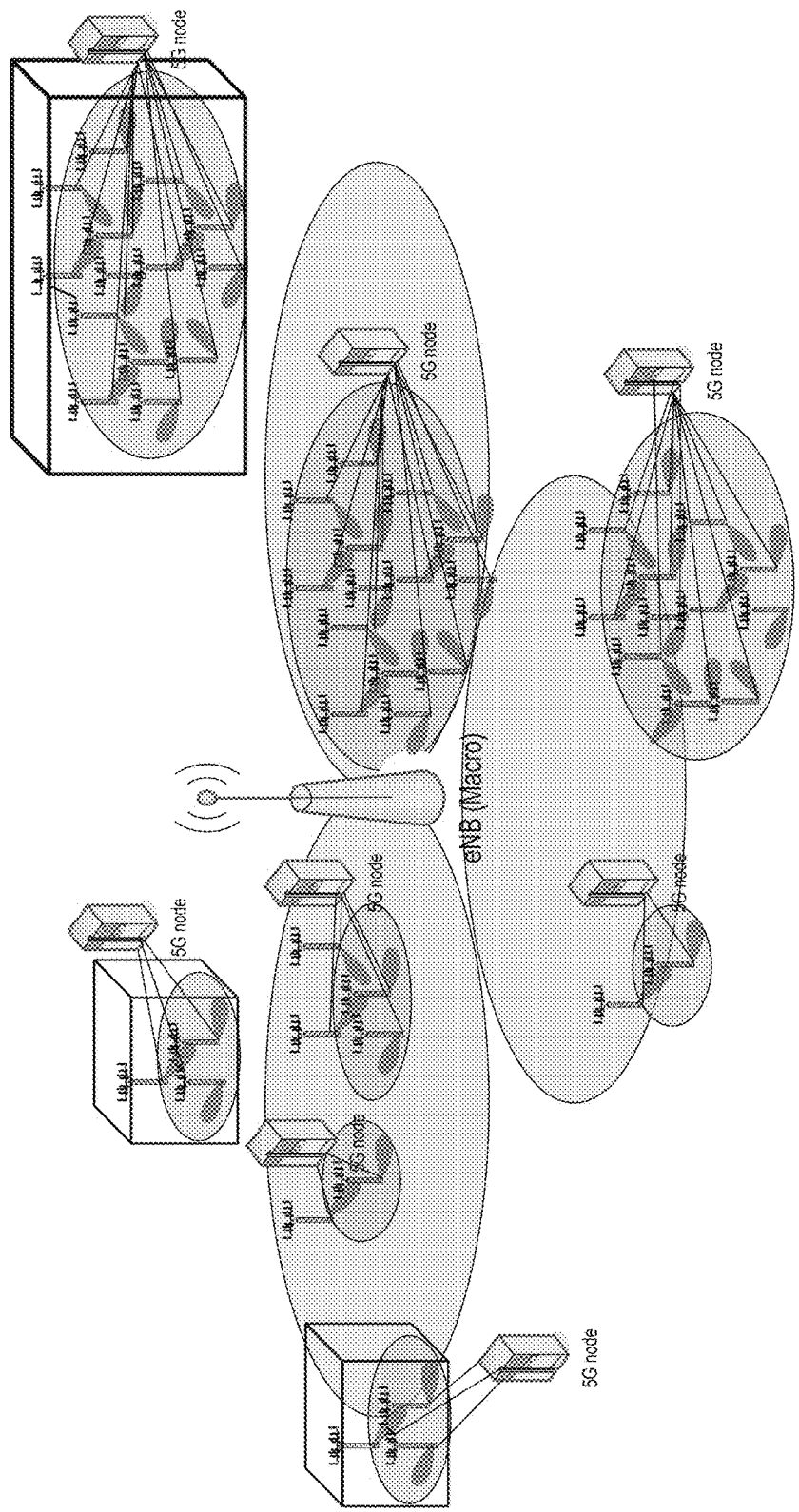
FIG. 10 shows a deployment with multiple TRP cells according to one exemplary embodiment.
Figure 11:
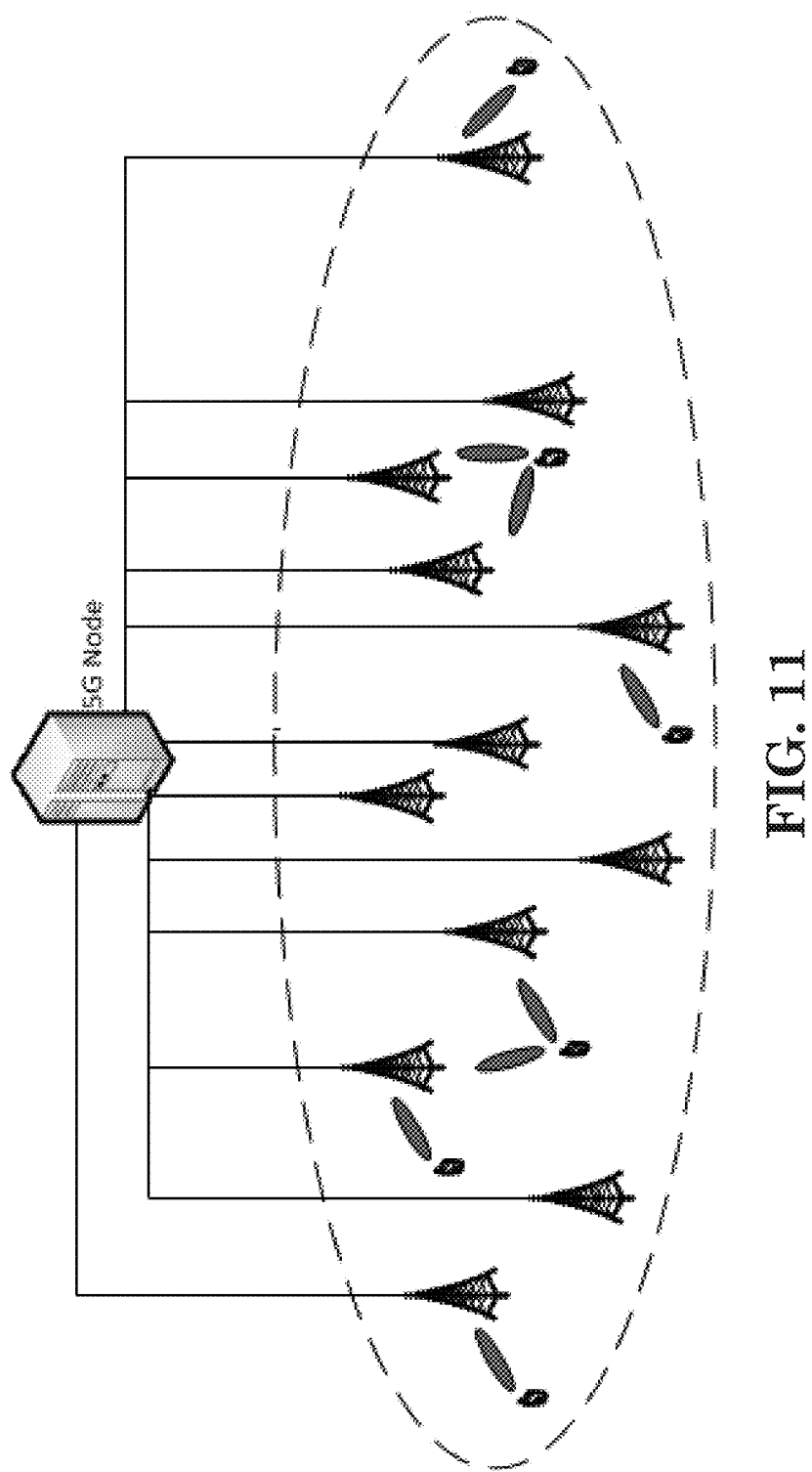
FIG. 11 illustrates a 5G cell comprising a 5G node with multiple TRPs according to one exemplary embodiment.
Figure 12:
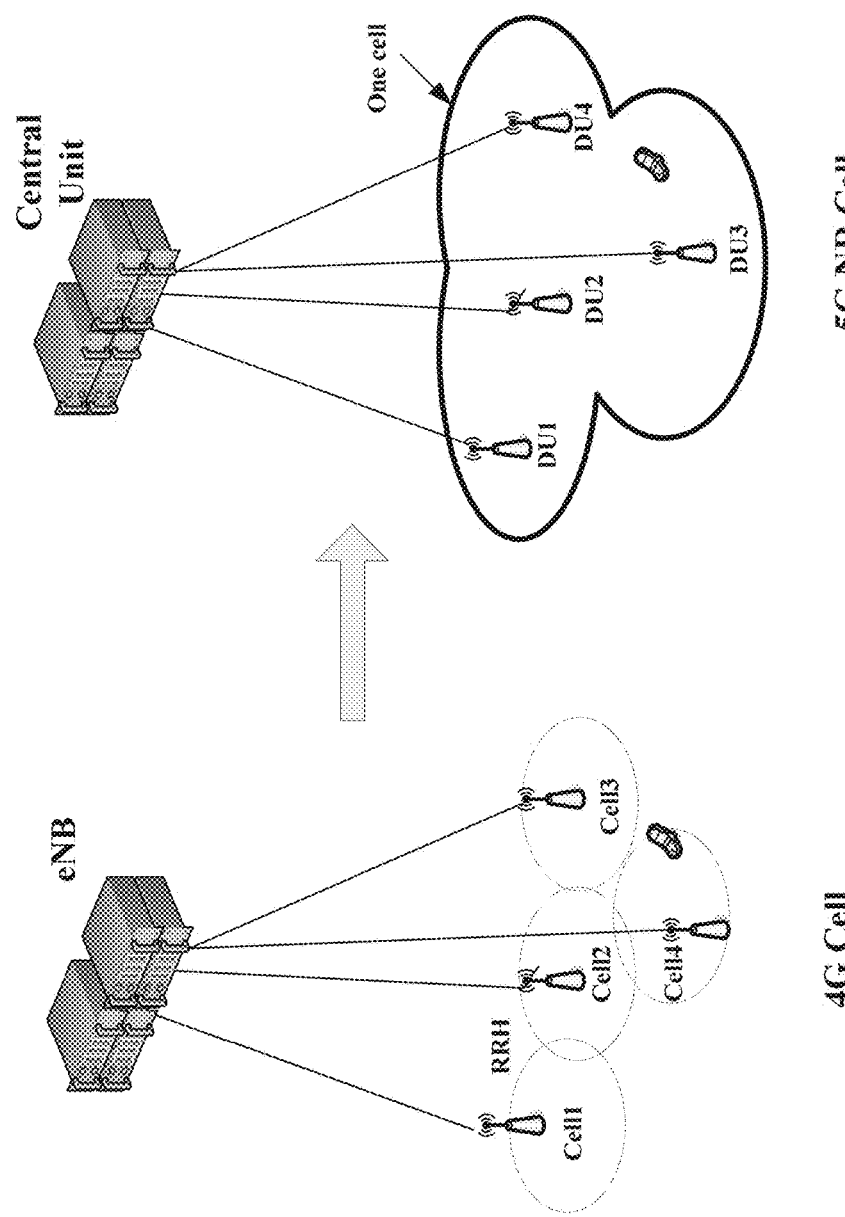
FIG. 12 shows an exemplary comparison between a LTE cell and a NR cell according to one exemplary embodiment.

FIGS. 9 to 12 show some examples of the concept of a cell in 5G NR. FIG. 9 shows an exemplary deployment with single TRP cell. FIG. 10 shows an exemplary deployment with multiple TRP cells. FIG. 11 shows an exemplary 5G cell comprising a 5G node with multiple TRPs. FIG. 12 shows an exemplary comparison between a LTE cell and a NR cell.

Apart from the handover based on RRM (Radio Resource Management) measurement, a 5G UE should be able to adapt the serving beam to maintain 5G connectivity subject to beam quality fluctuation or UE intra-cell mobility. In order to do that, 5G Node-B and UE should be able to track and change the serving beam properly (called beam tracking hereafter).

The following terminology may be used hereafter.

BS: a network central unit in NR which is used to control one or multiple TRPs which are associated with one or multiple cells. Communication between BS and TRP(s) is via fronthaul. BS could also be referred to as central unit (CU), eNB, gNB, or NodeB.

TRP: a transmission and reception point provides network coverage and directly communicates with UEs. TRP could also be referred to as distributed unit (DU).

Cell: a cell is composed of one or multiple associated TRPs, i.e. coverage of the cell is composed of coverage of all associated TRP(s). One cell is controlled by one BS. Cell could also be referred to as TRP group (TRPG).

Beam sweeping: in order to cover all possible directions for transmission and/or reception, a number of beams is required. Since it is not possible to generate all these beams concurrently, beam sweeping means to generate a subset of these beams in one time interval and change generated beam(s) in other time interval(s), i.e. changing beam in time domain. So, all possible directions can be covered after several time intervals.

Beam sweeping number: necessary number of time interval(s) to sweep beams in all possible directions once for transmission and/or reception. In other words, a signaling applying beam sweeping would be transmitted "beam sweeping number" of times within one time period, e.g. the signaling is transmitted in (at least partially) different beam(s) in different times of the time period.

Serving beam: serving beam for a UE is a beam generated by network, e.g., TRP, which is used to communicate with the UE, e.g. for transmission and/or reception.

The following assumptions for network side may be used hereafter:

NR using beamforming could be standalone, i.e. UE can directly camp on or connect to NR.

NR using beamforming and NR not using beamforming could coexist, e.g. in different cells.

TRP would apply beamforming to both data and control signaling transmissions and receptions, if possible and beneficial.

Number of beams generated concurrently by TRP depends on TRP capability, e.g. maximum number of beams generated concurrently by different TRPs may be different.

Beam sweeping is necessary, e.g. for the control signaling to be provided in every direction.

Figure 13:
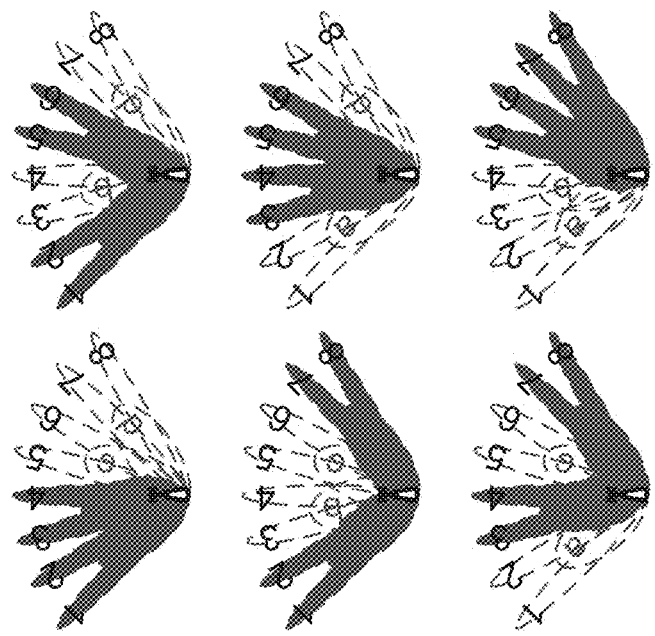
FIG. 13 illustrates an example for combination limitation of beam generation according to one exemplary embodiment.
Figure 13:
Figure 13:
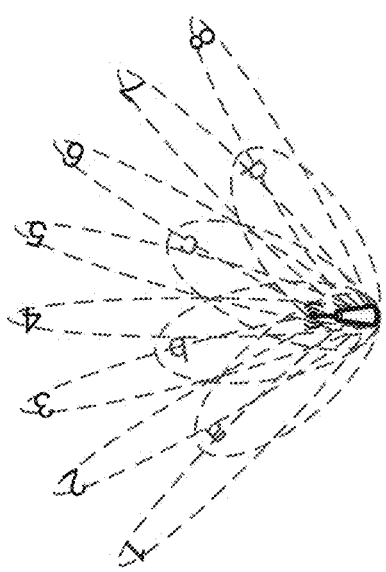

(For hybrid beamforming) TRP may not support all beam combinations, e.g., some beams could not be generated concurrently. FIG. 13 shows an example for combination limitation of beam generation.

Downlink timing of TRPs in the same cell are synchronized.

RRC layer of network side is in BS.

TRP should support both UEs with UE beamforming and UEs without UE beamforming, e.g., due to different UE capabilities or UE releases.

The following assumptions for UE side may be used hereafter:

UE may perform beamforming for reception and/or transmission, if possible and beneficial.

Number of beams generated concurrently by UE depends on UE capability, e.g., generating more than one beam is possible.

Beam(s) generated by UE is wider than beam(s) generated by eNB.

Beam sweeping for transmission and/or reception is generally not necessary for user data but may be necessary for other signaling, e.g., to perform measurement.

(For hybrid beamforming) UE may not support all beam combinations, e.g. some beams could not be generated concurrently. FIG. 13 shows an example for combination limitation of beam generation.

Not every UE supports UE beamforming, e.g. due to UE capability or UE beamforming is not supported in NR first (few) release(s).

One UE is possible to generate multiple UE beams concurrently and to be served by multiple serving beams from one or multiple TRPs of the same cell.

Same or different (DL or UL) data could be transmitted on the same radio resource via different beams for diversity or throughput gain.

There are at least two UE (RRC) states: connected state (or called active state) and non-connected state (or called inactive state or idle state).

Figure 14:
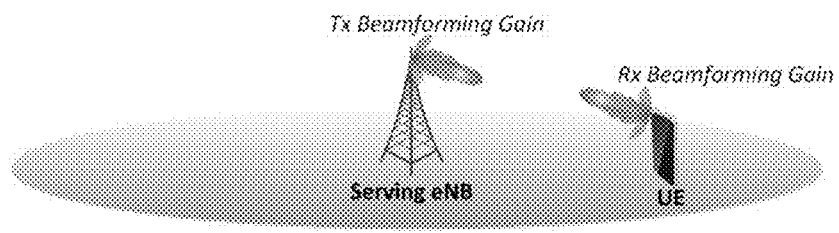
FIG. 14 is a reproduction of FIG. 3 of 3GPP R2-162251.

Based on 3GPP R2-162251, to use beamforming in both eNB and UE sides, practically, antenna gain by beamforming in eNB is considered about 15 to 30 dBi and the antenna gain of UE is considered about 3 to 20 dBi. FIG. 14, which is a reproduction of FIG. 3 of 3GPP R2-162251, illustrates gain compensation by beamforming.

Figure 15:
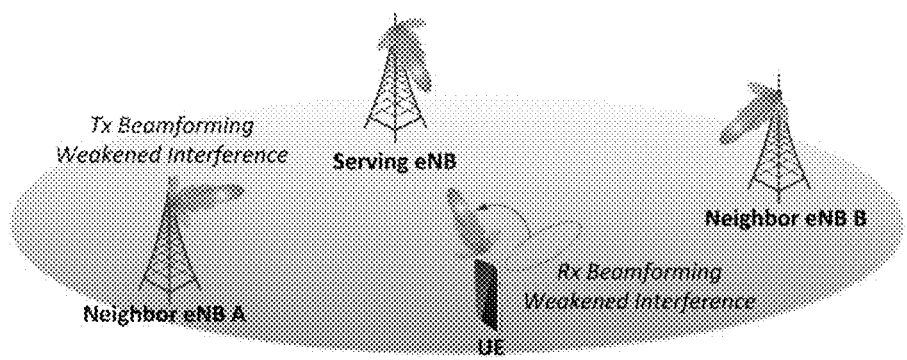
FIG. 15 is a reproduction of FIG. 4 of 3GPP R2-162251.

In SINR perspective, sharp beamforming reduces interference power from neighbor interferers, i.e., neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. FIG. 15, which is a reproduction of FIG. 4 of 3GPP R2-162251, illustrates weakened interference by beamforming.

When the UE is in connected state, the UE may move among different beams or TRPs of the same serving cell. Besides, if UE beamforming is used, UE beam(s) may also change over time, e.g., due to UE rotation.

In general, a case of mobility in connected state without cell change has the following steps:

Signaling for Change Detection
  Change of UE beam(s), serving beam(s) of serving TRP(s), and serving TRP(s) may be detected by UE and/or network. In order to detect the change, a signaling periodically transmitted by TRP(s) or UE could be used. TRP(s) periodically performs beam sweeping for reception or transmission of the signaling. If UE beamforming is used, UE periodically performs beam sweeping for reception or transmission of the signaling.
UE Beam Change
  If the change is detected by UE, UE itself may select proper UE beam(s) for the following reception (and transmission, e.g., for TDD). Alternatively, UE needs to provide feedback to network and network could provide an indication of UE beam change from network to UE.
  If the change is detected by network, indication of UE beam change from network to UE may be required. UE uses UE beam(s) indicated by network for the following transmission (and reception, e.g., for TDD).
Serving Beam and/or Serving TRP Change
  After UE receives the signaling for change detection, UE needs to provide feedback to network and network could decide whether to change (DL) serving beam(s) and/or serving TRP(s) for the UE. On the other hand, after TRP(s) receives the signaling for change detection, network could decide whether to change serving beam(s) and/or serving TRP(s) for the UE.

Figure 26:
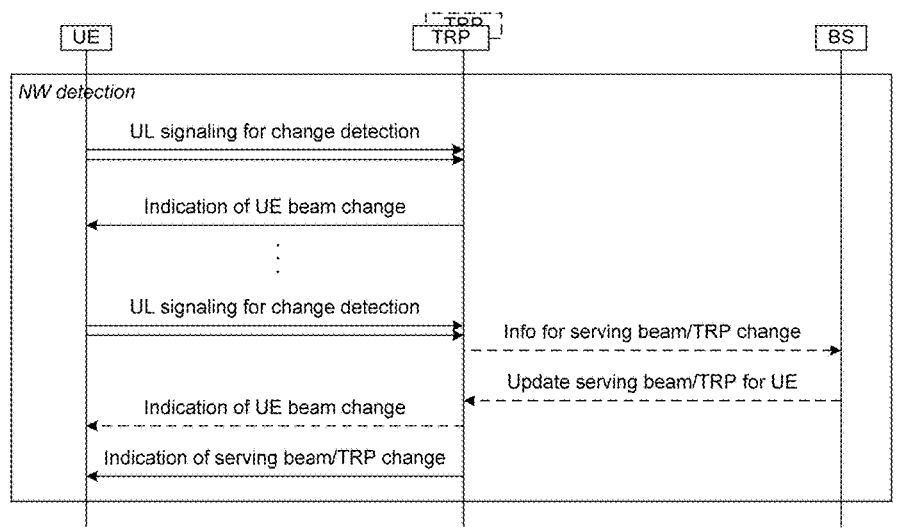
FIG. 26 is a message flow chart according to one exemplary embodiment.
Figure 27:
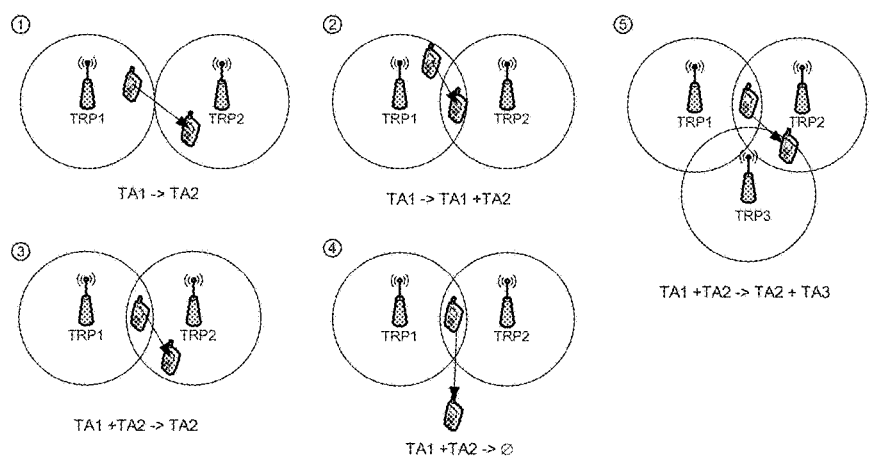
FIG. 27 illustrates the scenarios to update uplink timing advance according to one exemplary embodiment.

FIGS. 26 and 27 illustrate examples of flow charts for mobility in connected state without cell change.

When the UE is in connected state, the UE may leave the coverage of the serving cell and move to coverage of other cell. It is assumed that the UE needs to perform measurement in order to help detection of cell change. Network would control the change of UE's serving cell, e.g., via handover.

Measurement
  The UE should perform measurement on the serving cell and its neighbor cells to find better serving cell based on measurement configuration. The signaling to be measured is provided by beam sweeping. If UE beamforming is used, UE performs beam sweeping for reception of the signaling.
  In addition, radio quality of serving cell should be kept monitored by the UE in order to detect radio link failure. If radio link failure is detected, UE should try to recover radio link.
Measurement Report
  Based on the measurement result, the UE should provide a measurement report to serving BS.
Handover Initiation
  Based on the measurement report, the serving BS may decide to handover the UE to a target cell of neighbor BS based on negotiation between the serving BS and neighbor BS. Then, the serving BS would transmit a handover commend indicating a target cell to the UE.
Handover to Target Cell
  The UE should attempt to connect to the target cell for continuing the ongoing services. Since 0 ms mobility interruption is required, connection between UE and source cell should be kept when the UE tries to connect to the target cell. Connection can be released after UE successfully accesses the target cell. During handover, the UE needs to perform random access procedure to let target cell be aware of the UE.

In general, it is assumed that uplink timing advance is necessary in a NR cell. If the NR cell is composed of multiple TRPs, different uplink timing advance values may be required for uplink transmissions to different TRPs, e.g., different TRPs may have different sizes of network coverage. Then, operations of multiple uplink timing advance values in a cell need to be considered.

In a cell comprising of multiple TRPs, it is possible that a UE is served by more than one TRP within the cell, and UL transmissions from the UE may be transmitted to different TRP of the cell. Different uplink timing advance (TA) values may be required for uplink transmissions, and a UE needs to determine what TA value to use when it performs a UL transmission. Methods of determining what TA value to use for a UL transmission performed by a UE are considered below.

A UE can maintain a single TA value for a cell (even when different TA values are needed). Network can update the TA value dynamically for the UE, e.g. based on which TRP will receive a UL transmission.

In LTE, TA value is updated by receiving a Timing Advance Command MAC (Medium Access Control) CE (Control Element). Each update requires a downlink transmission of the TAC (Timing Advance Command) MAC CE. For a NR cell comprising multiple TRPs, it can be expected that the TA value needs to be updated more frequently, e.g., whenever a UL transmission is transmitted to a different TRP from previous transmission. The signaling overhead may be significant.

To reduce the signaling overhead for TA (Timing Advance) update, updating TA value along with UL scheduling could be considered. For example, a downlink signaling to schedule a UL transmission can be used to update TA value, e.g., when the UL transmission is transmitted to a different TRP from previous UL transmission. A field of TA value may be included in the downlink signaling. The TA value may be an absolute TA value which indicates what the TA value should be applied by the UE. Alternatively, the TA value may be a relative TA value which indicates an offset value to be shifted compared with the original TA value of the UE. After receiving the downlink signaling, the UE can update the TA value based on the downlink signaling and use the updated TA value for the UL transmission scheduled by the downlink signaling.

The updated TA value may be applied to the subsequent UL transmissions (until the maintained TA value is updated further). Alternatively, the TA value may be temporarily updated for one-shot use (i.e., it is applied for the specific UL transmission corresponding to the downlink signaling), but not applied for the subsequent UL transmissions (except the retransmission(s) of the specific UL transmission). The original TA value is not changed due to the downlink signaling and the original value will be used for subsequent UL transmissions.

The TA update mechanism can be jointly used with the Timing Advance Command MAC CE. For example, TA update along with UL scheduling is for one-shot use and TAC MAC CE is used continuously.

The adjustment range of TA update based on downlink signaling of UL scheduling may be smaller than that of TA update based on TAC MAC CE. The size of TA field in the downlink signaling may be smaller than the size of TAC MAC CE.

TA values for UL data transmissions may be per TRP, per group of TRPs, per NW (Network) beam, per group of NW beams, and/or etc.

The UL transmission may be UL data transmission. As for UL control signaling transmission, e.g., UL reference signal transmission, it may or may not be considered as the UL transmission mentioned above. The UL reference signal may be for beam management, e.g. beam finding or beam detection. The TA value used for UL control signaling transmission may be a specific TA value, e.g. a default value, zero, or etc. The specific TA value may be different from the TA value used for UL data transmission, i.e., the UE maintains TA values for UL data transmission and UL control signaling transmission separately.

Figure 16:
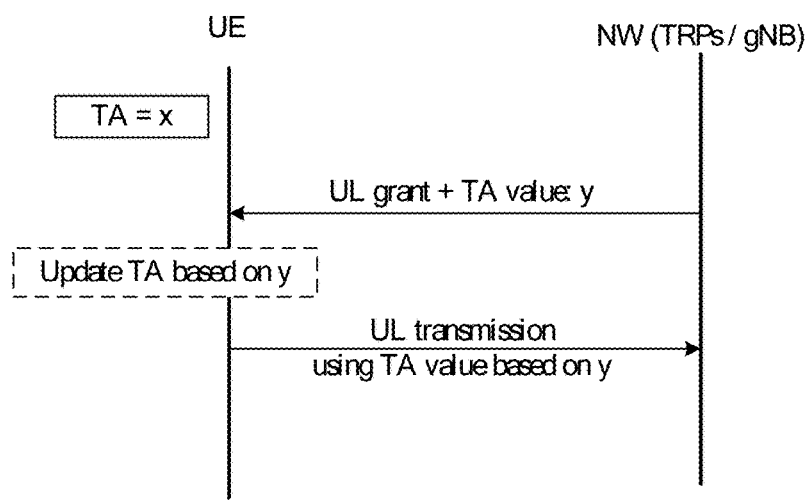
FIG. 16 shows an example of the method of single TA approach according to one exemplary embodiment.

FIG. 16 shows an example of the method of single TA approach.

Figure 17:
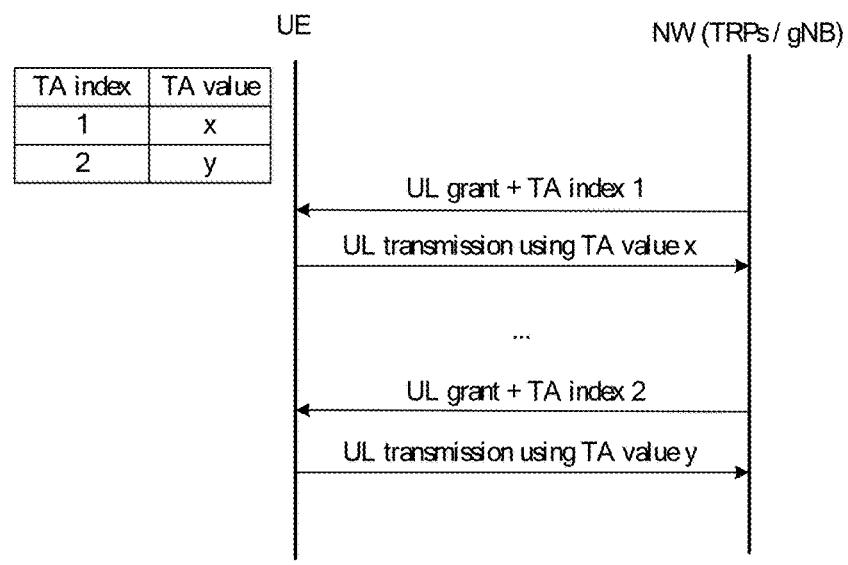
FIG. 17 shows an example of the method of multiple TA approach based on TA index according to one exemplary embodiment.

A UE can maintain one or more TA values for a cell. How many TA values are maintained may be controlled by network, e.g., based on network configuration. If more than one TA values are maintained by the UE, the UE needs to determine which TA value to be used for a UL transmission. Several alternatives are considered below:

One alternative to determine the TA value to be used for a UL transmission is based on TA index. FIG. 17 shows an example of this alternative. A mapping of TA index and maintained TA value may be provided by network. TA index corresponding to the TA value to be used for a UL transmission may be included in a downlink signaling to schedule the UL transmission. A UE determines which TA value to use for a UL transmission based on TA index indicated in a signaling to schedule the UL transmission.

For example, a UE is configured to maintain 2 TA values for a cell: {TA index#1=value1, TA index#2=value2}. If a signaling to schedule a UL transmission indicates TA index 1, the UE uses the maintained TA value1 for the UL transmission.

The maintained TA values may be updated by network. Network may update the maintained TA values via a control message, e.g. random access response and/or timing advance command MAC CE. Alternatively, network may update the maintained TA values via a downlink signaling, e.g., PDCCH (Physical Downlink Control Channel). The control message or signaling to update the maintained TA values should indicate which maintained TA value to be updated, e.g., by indicating TA index associated with the maintained TA value. One or multiple maintained TA values may be updated based on the same control message or signaling. Alternatively, different maintained TA values may be updated by different control message or signaling.

In LTE, if a UE is configured with more than one TAG, it has more than one TA values. However, one cell can only belong to one TAG at a time, and therefore there is only one TA value for a cell. Compared with LTE, the method allows a UE to maintain more than one TA values for a single cell.

Figure 18:
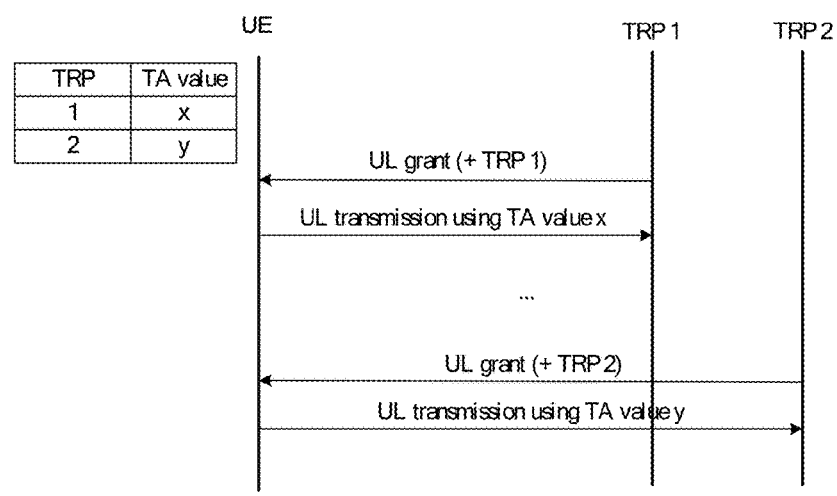
FIG. 18 shows an example of the method of multiple TA approach based on TRP according to one exemplary embodiment.

Another alternative to determine the TA value to be used for a UL transmission is based on TRP (or NW beam). FIG. 18 shows an example of this alternative. It may be assumed that a maintained TA value is associated with a (group of) TRP (or NW beam). Different (groups of) TRPs (or NW beams) may be associated with different TA values. More than one TRP (or NW beam) may be associated with the same TA value. A group of TRPs may comprise one or multiple TRPs. The association of maintained TA value and (group of) TRP (or NW beam) may be provided by network.

In this alternative, a UE determines the TA value to be used for a UL transmission by identifying the (group of) TRP (or NW beam) associated with the UL transmission. The UE uses the TA value associated with the identified (group of) TRP (or NW beam) for the UL transmission.

If UE beamforming is used by the UE, the TA value to be used for a UL transmission may be irrelevant with which UE beam is used for the UL transmission. The UE may not maintain TA value based on UE beams, e.g., per UE beam. The UE may use the same TA value for UL transmission via different UE beams.

For example, the (group of) TRP (or NW beam) associated with a UL transmission could be the (group of) TRP (or NW beam) that receives the UL transmission. In case that the UE cannot detect which (group of) TRP (or NW beam) will receive the UL transmission by itself, the (group of) TRP (or NW beam) can be indicated by a downlink signaling to schedule the UL transmission. It may be explicitly indicated in the downlink signaling or implicitly indicated by which (group of) TRP (or NW beam) transmits the downlink signaling. Other possible methods are not excluded.

This alternative may require a UE to recognize TRPs (or NW beams) of a cell.

Figure 19:
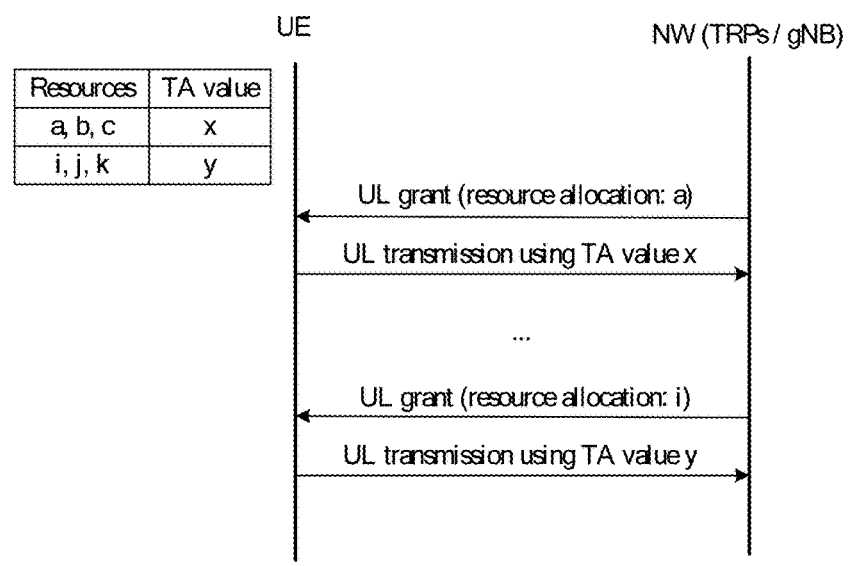
FIG. 19 shows an example of the method of multiple TA approach based on resources for uplink transmission according to one exemplary embodiment.

Another alternative to determine the TA value to be used for a UL transmission is based on UL resource (UL timing). FIG. 19 shows an example of this alternative. It may be assumed that UL resources (or UL timing) for UL transmissions are divided by (groups of) TRPs (or NW beams) of a cell. A maintained TA value is associated with a set of UL resources (or UL timing). The association of maintained TA values and the sets of UL resources (or UL timing) may be provided by network.

In this alternative, a UE determines the TA value to be used for a UL transmission based on the scheduled UL resource (or UL timing) for the UL transmission. The UE uses the TA value associated with the UL resource (or UL timing) for the UL transmission.

For example, a UE is configured to maintain 2 TA values for a cell: {TA=value1 for subframe 0, 2, 4, 6, 8; TA=value2 for subframe 1, 3, 5, 7, 9}. If a UL transmission is scheduled to be transmitted in subframe 3, the UE uses the maintained TA value value2 for the UL transmission.

This alternative may require a cell to separate UL resources (or UL timing) between TRPs (or NW beams) of the cell.

In the above alternatives, TA values for UL data transmissions may be per TRP, per group of TRPs, per NW beam, per group of NW beams, and/or etc.

The UL transmission may be UL data transmission. As for UL control signaling transmission (e.g., UL reference signal transmission), it may or may not be considered as the UL transmission mentioned above. The UL reference signal may be for beam management, e.g., beam finding or beam detection. The TA value used for UL control signaling transmission may be a specific TA value (e.g., a default value, zero, or etc.). The specific TA value may be different from the TA value used for UL data transmission, i.e., the UE maintains TA values for UL data transmission and UL control signaling transmission separately.

The maintained TA values may be updated by network. The network may update the maintained TA values via a control message (e.g., random access response and/or a timing advance command MAC CE). Alternatively, the network may update the maintained TA values via a downlink signaling, e.g., PDCCH. The control message or signaling to update the maintained TA values should indicate which maintained TA value to be updated, e.g., by indicating TA index associated with the maintained TA value. One or multiple maintained TA values may be updated based on the same control message or signaling. Alternatively, different maintained TA values may be updated by different control message or signaling.

Figure 20A:
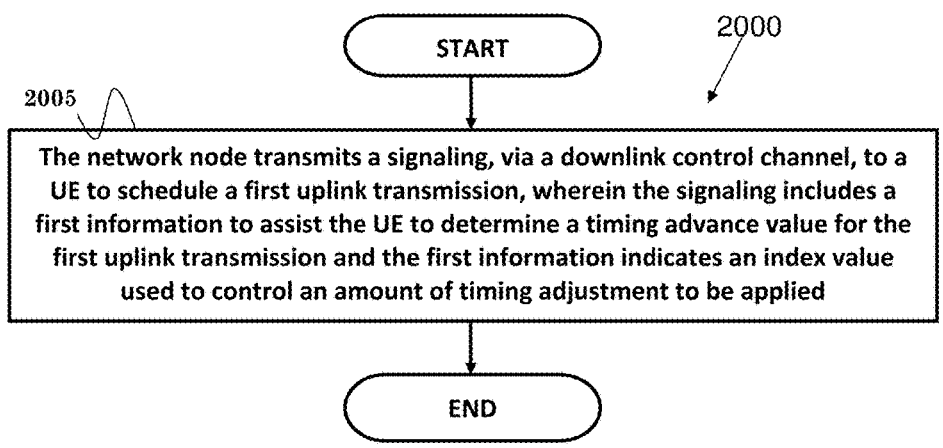
FIG. 20A is a flow chart according to one exemplary embodiment.

FIG. 20A is a flow chart 2000 according to one exemplary embodiment from the perspective of a network node. In step 2005, the network node transmits a signaling, via a downlink control channel, to a UE to schedule a first uplink transmission, wherein the signaling includes a first information to assist the UE to determine a timing advance value for the first uplink transmission and the first information indicates an index value used to control an amount of timing adjustment to be applied.

Referring back to FIGS. 3 and 4, in one exemplary embodiment of a network node, the device 300 includes a program code 312 stored in the memory 310. The CPU 308 could execute program code 312 to enable the network node to transmit a signaling, via a downlink control channel, to a UE to schedule a first uplink transmission, wherein the signaling includes a first information to assist the UE to determine a timing advance value for the first uplink transmission and the first information indicates an index value used to control an amount of timing adjustment to be applied. Furthermore, the CPU 308 can execute the program code 312 to perform all of the above-described actions and steps or others described herein.

Figure 21A:
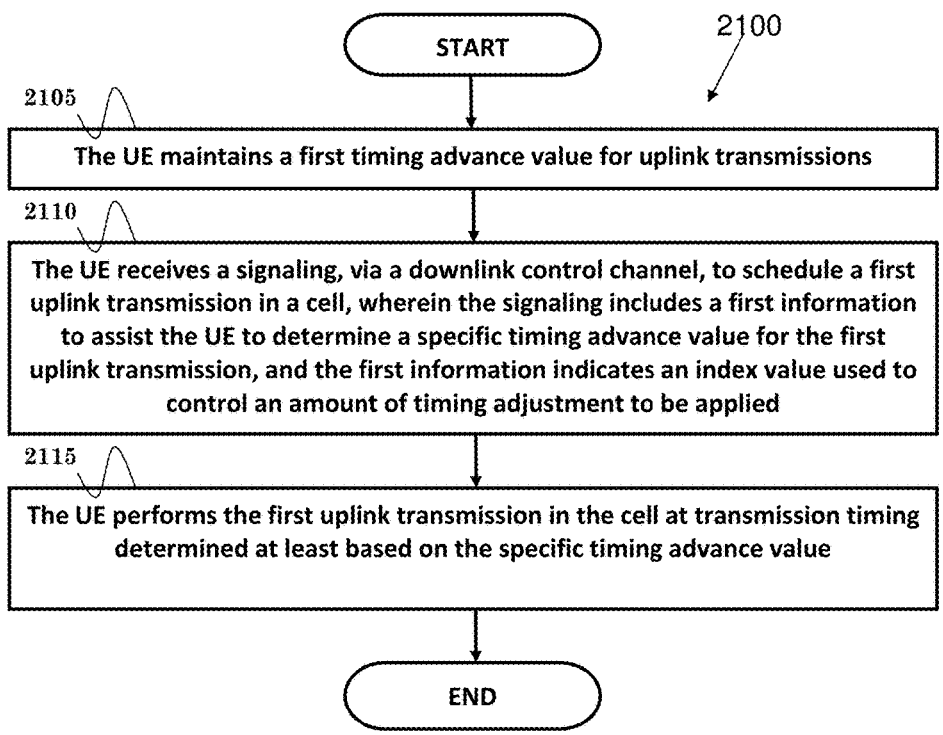
FIG. 21A is a flow chart according to one exemplary embodiment.

FIG. 21A is a flow chart 2100 according to one exemplary embodiment from the perspective of a UE. In step 2105, the UE maintains a first timing advance value for uplink transmissions. In step 2110, the UE receives a signaling, via a downlink control channel, to schedule a first uplink transmission in a cell, wherein the signaling includes a first information to assist the UE to determine a specific timing advance value for the first uplink transmission, and the first information indicates an index value used to control an amount of timing adjustment to be applied. In step 2115, the UE performs the first uplink transmission in the cell at transmission timing determined at least based on the specific timing advance value.

Referring back to FIGS. 3 and 4, in one exemplary embodiment of a UE, the device 300 includes a program code 312 stored in the memory 310. The CPU 308 could execute program code 312 to enable the UE (i) to maintain a first timing advance value for uplink transmissions, (ii) to receive a signaling, via a downlink control channel, to schedule a first uplink transmission in a cell, wherein the signaling includes a first information to assist the UE to determine a specific timing advance value for the first uplink transmission, and the first information indicates an index value used to control an amount of timing adjustment to be applied, and (iii) to perform the first uplink transmission in the cell at transmission timing determined at least based on the specific timing advance value. Furthermore, the CPU 308 can execute the program code 312 to perform all of the above-described actions and steps or others described herein.

In the context of the embodiments illustrated in FIGS. 20A and 21A, and discussed above, in one embodiment, the first information could indicate an amount of change of the uplink timing relative to the current uplink timing (e.g., an offset value) or an amount of timing alignment to be applied for the first uplink transmission, as discussed in 3GPP TS 36.213. The first information could represent an absolute timing advance value to be applied or a relative timing advance value to be adjusted.

In one embodiment, the UE could update the first timing advance value at least based on the first information. The UE could use the updated first timing advance value for the first uplink transmission. Alternatively, the UE does not update the first timing advance value based on the first information. The first information does not affect uplink transmissions following the first transmission. The UE could maintain at least the first timing advance value and a second timing advance value.

Figure 20B:
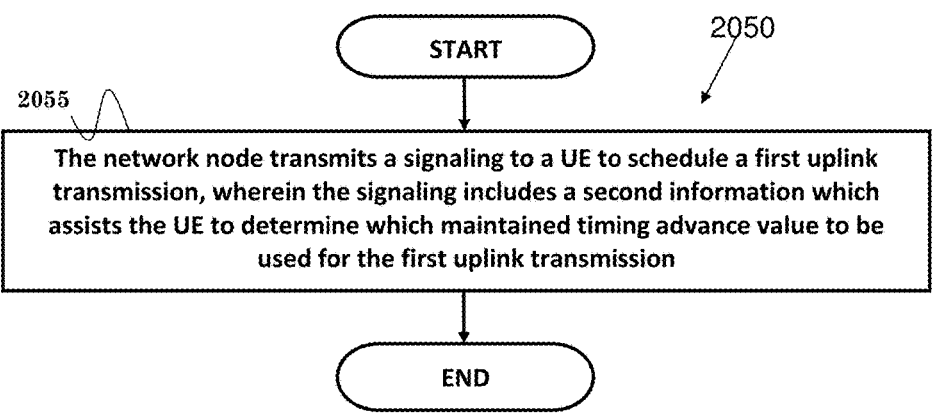
FIG. 20B is a flow chart according to one exemplary embodiment.

FIG. 20B is a flow chart 2050 according to one exemplary embodiment from the perspective of a network node. In step 2055, the network node transmits a signaling to a UE to schedule a first uplink transmission, wherein the signaling includes a second information which assists the UE to determine which maintained timing advance value to be used for the first uplink transmission.

Referring back to FIGS. 3 and 4, in one exemplary embodiment of a network node, the device 300 includes a program code 312 stored in the memory 310. The CPU 308 could execute program code 312 to enable the network node to transmit a signaling to a UE to schedule a first uplink transmission, wherein the signaling includes a second information which assists the UE to determine which maintained timing advance value to be used for the first uplink transmission. Furthermore, the CPU 308 can execute the program code 312 to perform all of the above-described actions and steps or others described herein.

Figure 21B:
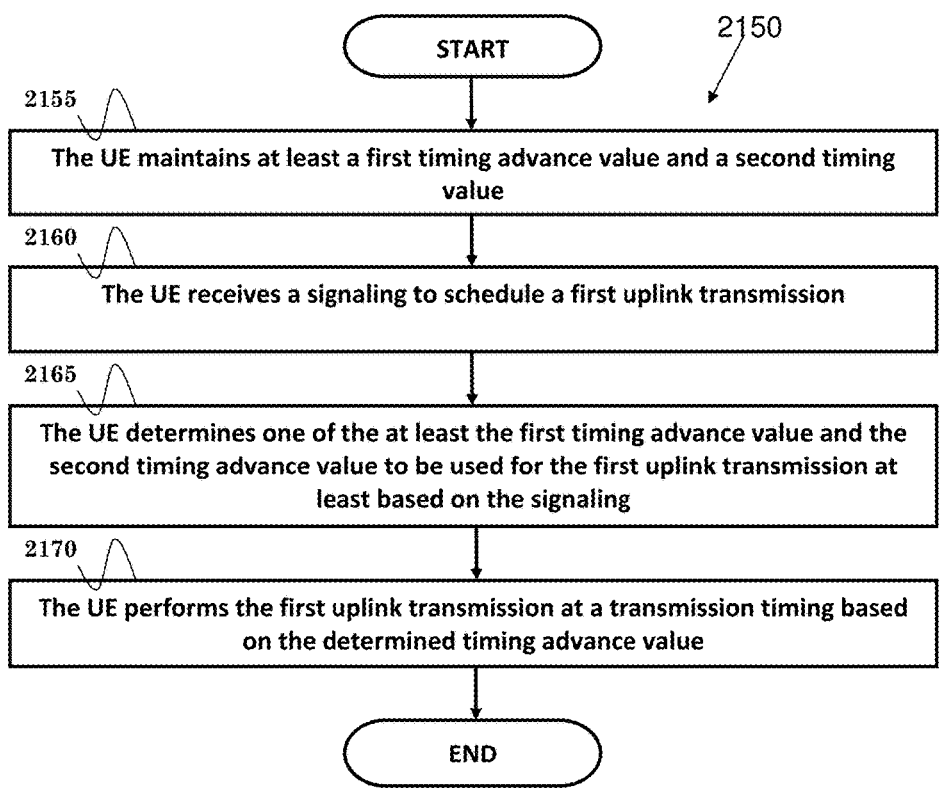
FIG. 21B is a flow chart according to one exemplary embodiment.

FIG. 21B is a flow chart 2150 according to one exemplary embodiment from the perspective of a UE. In step 2155, the UE maintains at least a first timing advance value and a second timing advance value. In step 2160, the UE receives a signaling to schedule a first uplink transmission. In step 2165, the UE determines one of the at least the first timing advance value and the second timing advance value to be used for the first uplink transmission at least based on the signaling. In step 2170, the UE performs the first uplink transmission at transmission timing based on the determined timing advance value.

Referring back to FIGS. 3 and 4, in one exemplary embodiment of a UE, the device 300 includes a program code 312 stored in the memory 310. The CPU 308 could execute program code 312 to enable the UE (i) to maintain at least a first timing advance value and a second timing advance value, (ii) to receive a signaling to schedule a first uplink transmission, (iii) to determine one of the at least the first timing advance value and the second timing advance value to be used for the first uplink transmission at least based on the signaling, and (iv) to perform the first uplink transmission at transmission timing based on the determined timing advance value. Furthermore, the CPU 308 can execute the program code 312 to perform all of the above-described actions and steps or others described herein.

In one embodiment, the signaling is not a random access response. The signaling is not in response to a random access preamble transmitted by the UE. The signaling is not received during a random access procedure. The signaling could be scrambled by a UE-specific identity. The UE-specific identity could be C-RNTI (Cell Radio Network Temporary Identifier).

In one embodiment, the signaling could include a second information which assists the UE to determine which maintained timing advance value to be used for the first uplink transmission. The UE could determine which maintained timing advance value to be used for the first uplink transmission at least based on the second information. The signaling could be received (or transmitted) via a downlink control channel.

In one embodiment, the second information could indicate which maintained timing advance value is used for the first uplink transmission. The second information could be an index of the maintained timing advance values. The UE could use the maintained timing advance value associated with the index for the first uplink transmission.

Alternatively, the second information could indicate a TRP associated with the maintained timing advance value to be used for the first uplink transmission. The UE could use the maintained timing advance value associated with the TRP for the first uplink transmission. As an example, the UE could use the maintained timing advance value associated with a TRP that the first uplink transmission is transmitted to for the first uplink transmission. As another example, the UE could use the maintained timing advance value associated with a TRP that transmits the signaling for the first uplink transmission.

In one embodiment, the second information could indicate a group of TRPs associated with the maintained timing advance value to be used for the first uplink transmission. The UE could use the maintained timing advance value associated with the group of TRPs for the first uplink transmission.

In one embodiment, the second information could indicate a network beam associated with the maintained timing advance value to be used for the first uplink transmission. The UE could use the maintained timing advance value associated with the network beam for the first uplink transmission. The UE could use the maintained timing advance value associated with the network beam that transmits the signaling for the first uplink transmission.

In one embodiment, the second information could indicate a group of network beams associated with the maintained timing advance value to be used for the first uplink transmission. The UE could use the maintained timing advance value associated with the group of network beams for the first uplink transmission.

The UE could determine which maintained timing advance value is to be used for the first uplink transmission at least based on a radio resource allocated for the first uplink transmission. Alternatively, the UE could use the maintained timing advance value associated with the radio resource for the first uplink transmission. The UE could determine which maintained timing advance value to be used for the first uplink transmission at least based on a timing of the radio resource allocated for the first uplink transmission. The UE could use the maintained timing advance value associated with the timing of the radio resource for the first uplink transmission.

The UE could maintain different timing advance values for different TRPs, for different groups of TRPs, for different network beams, and/or for different groups of network beams. The different TRPs, groups of TRPs, network beams, and/or groups of network beams could belong to the same cell.

In one embodiment, the UE could receive a message via a downlink data channel, wherein the message includes an uplink grant and a third information for uplink timing adjustment. The message could be a random access response. The message could be in response to a random access preamble transmitted by the UE. The message could be received during a random process procedure. The message could be scrambled by a non-UE specific identity, such as a RA-RNTI (Random Access-Radio Network Temporary Identifier).

In one embodiment, the third information could indicate an index value used to control the amount of timing adjustment to be applied, as discussed in 3GPP TS 36.321. The third information could indicate an amount of change of the uplink timing relative to the current uplink timing (e.g., an offset value) or an amount of timing alignment to be applied for the first uplink transmission, as discussed in 3GPP TS 36.213. The third information could represent an absolute timing advance value to be applied, or a relative timing advance value to be adjusted.

In one embodiment, the UE could receive a fourth information for uplink timing adjustment. The fourth information could be a MAC control element (e.g., timing advance command MAC control element as discussed in 3GPP TS 36.321). The fourth information could be received via a downlink data channel. The UE could update the maintained timing advance value at least based on the fourth information.

In one embodiment, the fourth information could affect transmission timing of the second uplink transmission (other than the first transmission). The fourth information could indicate an index value used to control the amount of timing adjustment to be applied (as discussed in 3GPP TS 36.321). The fourth information could indicate an amount of change of the uplink timing relative to the current uplink timing (e.g., an offset value), or an amount of timing alignment to be applied for the first uplink transmission, as discussed in 3GPP TS 36.213. The fourth information could represent an absolute timing advance value to be applied, or a relative timing advance value to be adjusted.

In one embodiment, the first uplink transmission could be data transmission. The second uplink transmission could be data transmission.

In one embodiment, the UE could maintain the first timing advance value and/or the second timing advance value for uplink data transmissions. The UE could maintain a third timing advance value for an uplink control signaling transmission. The third timing advance value could be a predefined value, a default value, or a fixed value (e.g., zero). The first timing advance value and/or the second timing advance value may not be used for the uplink control signaling transmission.

In one embodiment, the uplink control signaling could be an uplink reference signal. The uplink reference signal could be for beam management (e.g., beam finding, beam detection).

In one embodiment, the downlink control channel could be a physical downlink control channel, e.g., PDCCH (Physical Downlink Control Channel). The downlink data channel could be a physical downlink data channel, e.g., PDSCH (Physical Downlink Shared Channel).

In one embodiment, the UE could maintain a single timing advance value for the cell. The cell could be primary cell of the UE.

If different uplink timing advance values are required for uplink transmissions to different TRPs, the procedure of updating the UL timing advance value(s), e.g., including addition, modification, and/or removal, needs to be developed. Examples of scenarios which require updating UL timing advance are shown in FIG. 27.

Each timing advance value maintained by the UE may be associated with one or multiple TRPs (of the same cell). In order to update a UL (Uplink) timing advance value, a TA index could be used to identify the UL timing advance value to be updated. Configuration of the TA index may be provided by network, e.g., mapping between TRP(s) and TA index(es) or mapping between beam(s) and TA index(es). The configuration may be provided via RRC (Radio Resource Control) message.

In order to estimate a new UL timing advance for the UE to maintain, network (e.g., target TRP) needs to measure UL signal from the UE to derive the new UL timing advance. The UL signal could be preamble, reference signal, or etc. The UL signal may be periodically transmitted by the UE (e.g., via UE beam sweeping), or requested by network dynamically (e.g., for resource efficiency). If transmission of the UL signal is based on request from the network, the network could transmit a first indication to ask the UE to transmit the UL signal, e.g., via certain UE beam(s) or via UE beam sweeping. The first indication may indicate one or multiple information as follows:

- resource for the UL signal, e.g. which is aperiodic,
- dedicated preamble,
- information related to transmission power of the UL signal,
- TA index for which associated UL timing advance is to be added/estimated,
- information for the UE to decide UE beam(s) used to transmit the UL signal, e.g. identifier of network or UE beam(s), and
- information of the network beam(s), e.g. network beam identifier, or receiving time of the network beam(s).

The first indication may be a physical layer or MAC layer control signaling. When the UE receives the first indication, the UE would start transmitting the UL signal and may use a timer to control retransmission of the UL signal. The UE may ramp up the transmission power of the UL signal, e.g., for retransmission, before successful delivery. The UE may consider that the UL signal is successfully delivered if the UE receives a second indication (described below) in response to the UL signal, e.g., a TA index in the second indication is the same as that in the first indication.

After network estimates new UL timing advance successfully, network could send a second indication for addition of new UL timing advance. The second indication may indicate one or multiple information as follows:

- an UL timing advance value,
- TA index for which the associated UL timing advance value would be added or modified, and
- resource for (one new) UL transmission.

The difference between the second indication and random access response in LTE is that the second indication may not include UE identity (e.g., Temporary C-RNTI) and/or preamble identifier (e.g., RAPID (Random Access Preamble Identifier)). The second indication may be scrambled by UE identity, e.g., C-RNTI as discussed in 3GPP TS 36.321. The UL timing advance value may be an absolute value or a relative value (of other maintained UL timing advance value). The UE may transmit a confirmation (e.g., physical layer or MAC layer control signaling) in response to reception of the second indication. The resource may be used by the UE to transmit a control signaling, e.g., the confirmation, PHR (Power Headroom Report), and/or etc. The second indication may be a physical layer or MAC layer control signaling.

On the other hand, UE may stop maintaining an UL timing advance value, e.g., when the UE leaves coverage of TRP(s) associated with the UL timing advance. Only utilizing timer to control validity of the UL timing advance, e.g., as LTE discussed in 3GPP TS 36.321, may not be efficient since the UE may keep performing transmissions, e.g., UL reference signal, to the TRP(s) using invalid UL timing advance value until the timer is expired. Alternatively, network could send a third indication to ask the UE to remove, discard, or stop maintaining certain UL timing advance value(s). The third indication may indicate TA index(es) (e.g., expressed by index list or bitmap) that the UE should stop maintaining associated UL timing advance value(s). The third indication may be a physical layer or MAC layer control signaling. When the UE receives the third indication, the UE would stop maintaining the associated UL timing advance value(s), e.g., stop timer(s) associated with the UL timing advance value(s), and may stop UL transmission(s) associated with the UL timing advance value(s), e.g., stop UL transmission(s) to TRP(s) or stop UL transmission(s) via beam(s) associated with the UL timing advance value(s). The UL transmission(s) may be data transmission(s) or UL reference signal. UL (HARM) buffer may not be flushed in response to reception of the third indication. (RRC) Configuration, e.g., for PUCCH (Physical Uplink Control Channel), SRS (Sounding Reference Symbols), or UL reference signal, may not be released in response to reception of the third indication. Semi-persistent scheduled resource associated with the UL timing advance value(s) may be cleared, released, or discarded.

Update of UL timing advance may be required when the UE moves from a first TRP (source TRP) to a second TRP (target TRP). The first indication, the second indication, and/or the third indication may be transmitted by the first TRP or the second TRP. The first indication, the second indication, and/or the third indication may be transmitted by the same TRP or different TRPs.

Figure 28:
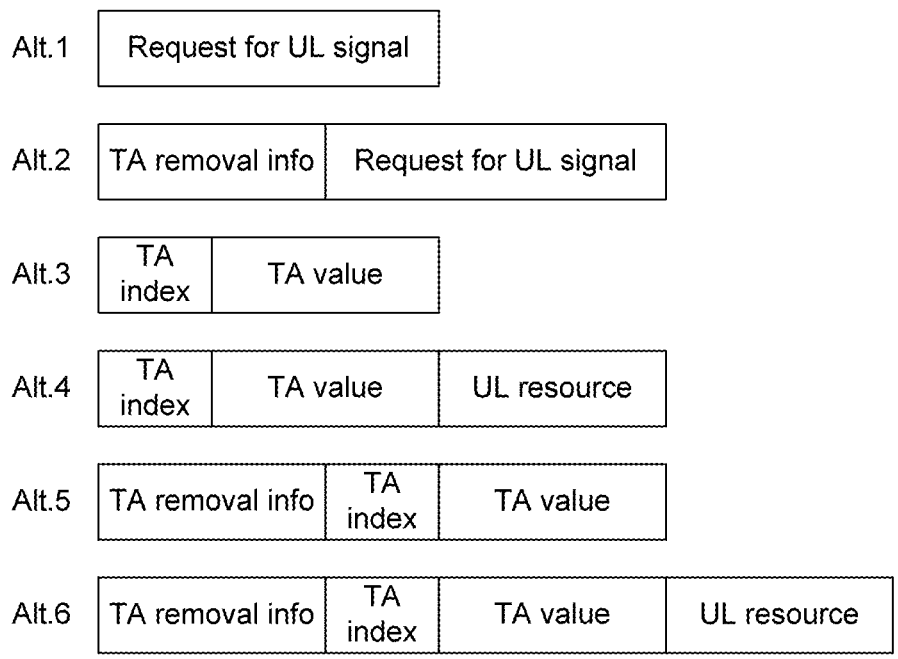
FIG. 28 shows the examples of the timing advance reconfiguration command according to one exemplary embodiment.

To handle different scenarios shown in FIG. 27, some or all of the first indication (e.g., request for UL signal), the second indication (e.g., TA index, TA value, and/or UL resource), and the third indication (e.g. TA removal information) may be carried by the same signal. Some examples are shown in FIG. 28.

Figure 29:
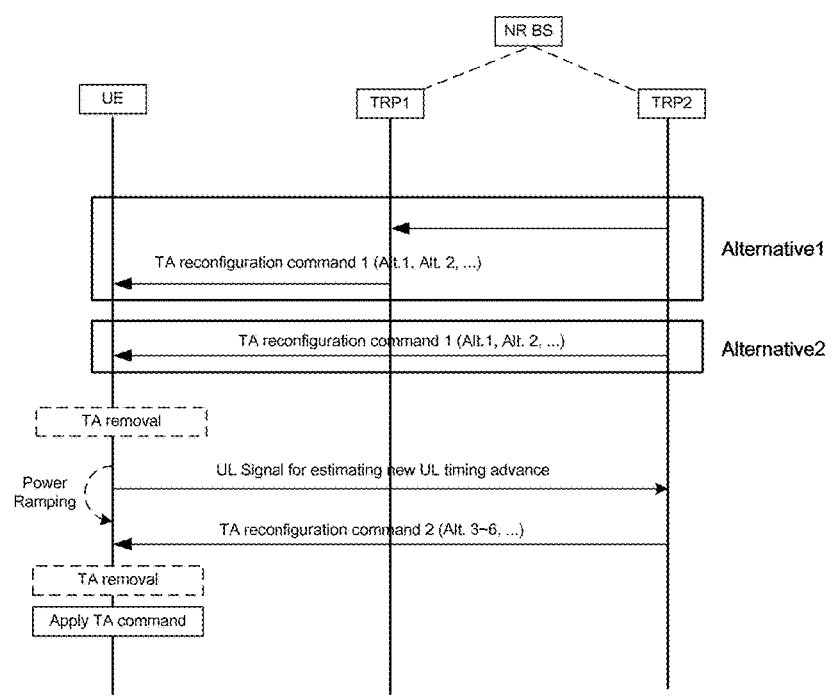
FIG. 29 shows an example of updating timing advance according to one exemplary embodiment.

An exemplary flow chart of updating UL timing advance when the UE moves from a first TRP (e.g., TRP1) to a second TRP (e.g., TRP2) is depicted in FIG. 29.

Figure 30A:
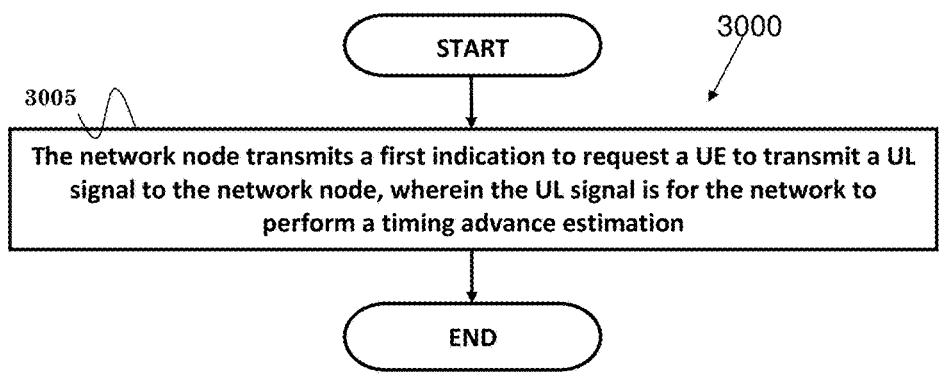
FIG. 30A is a flow chart according to one exemplary embodiment.

FIG. 30A is a flow chart 3000 according to one exemplary embodiment from the perspective of a network node. In step 3005, the network node transmits a first indication to request a UE to transmit a UL signal to the network node, wherein the UL signal is for the network node to perform a timing advance estimation.

Referring back to FIGS. 3 and 4, in one exemplary embodiment of a network node, the device 300 includes a program code 312 stored in the memory 310. The CPU 308 could execute program code 312 to enable the network node to transmit a first indication to request a UE to transmit a UL signal to the network node, wherein the UL signal is for the network node to perform a timing advance estimation.

Furthermore, the CPU 308 can execute the program code 312 to perform all of the above-described actions and steps or others described herein.

Figure 30B:
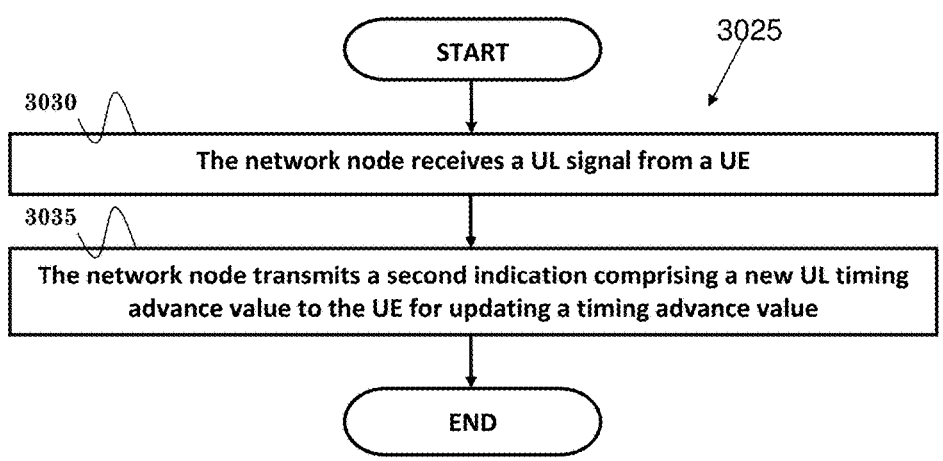
FIG. 30B is a flow chart according to one exemplary embodiment.

FIG. 30B is a flow chart 3025 according to one exemplary embodiment from the perspective of a network node. In step 3030, the network node receives a UL signal from a UE. In step 3035, the network node transmits a second indication comprising a new UL timing advance value to the UE for updating a timing advance value.

Referring back to FIGS. 3 and 4, in one exemplary embodiment of a network node, the device 300 includes a program code 312 stored in the memory 310. The CPU 308 could execute program code 312 to enable the network node (i) to receive a UL signal from a UE, and (ii) to transmit a second indication comprising a new UL timing advance value to the UE for updating a timing advance value. Furthermore, the CPU 308 can execute the program code 312 to perform all of the above-described actions and steps or others described herein.

In one embodiment, the new UL timing advance value could be estimated by the network node at least based on the UL signal. The new UL timing advance value could be an absolute value, wherein the absolute value means that the new UL timing advance value is applied without any initial value. The new UL timing advance value could also be a relative value, wherein the relative value means that the new UL timing advance value is utilized to adjust maintained timing advance value.

In one embodiment, updating the timing advance could be to add a new timing advance value, wherein the new timing advance value means that the UE is not maintaining it. Updating a timing advance could be to modify an old timing advance value, wherein the old timing advance value means that the UE is still maintaining it.

Figure 30C:
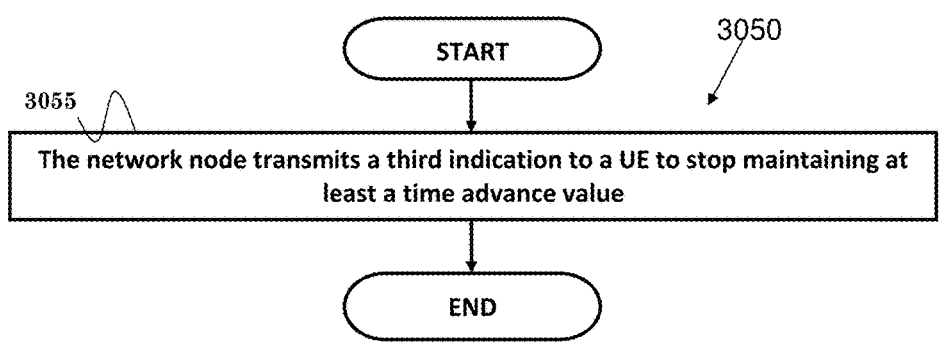
FIG. 30C is a flow chart according to one exemplary embodiment.

FIG. 30C is a flow chart 3050 according to one exemplary embodiment from the perspective of a network node. In step 3055, the network node transmits a third indication to a UE to stop maintaining at least a time advance value.

Referring back to FIGS. 3 and 4, in one exemplary embodiment of a network node, the device 300 includes a program code 312 stored in the memory 310. The CPU 308 could execute program code 312 to enable the network node to transmit a third indication c to a UE to stop maintaining at least a time advance value. Furthermore, the CPU 308 can execute the program code 312 to perform all of the above-described actions and steps or others described herein.

Figure 31A:
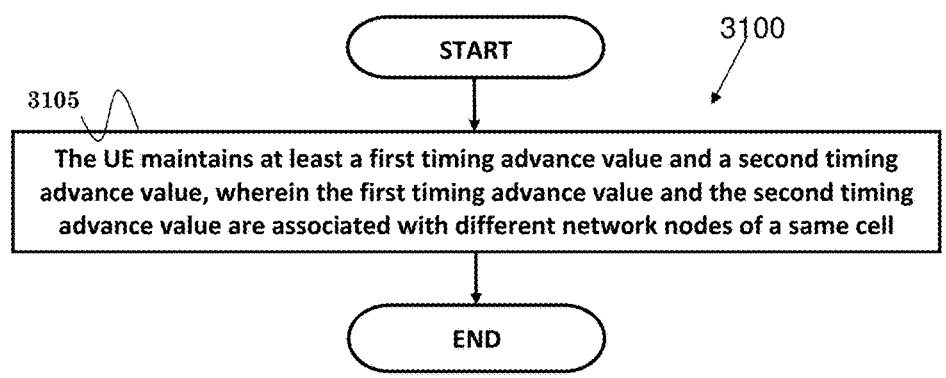
FIG. 31A is a flow chart according to one exemplary embodiment.

FIG. 31A is a flow chart 3100 according to one exemplary embodiment from the perspective of a UE. In step 3105, the UE maintains at least a first timing advance value and a second timing advance value, wherein the first timing advance value and the second timing advance value are associated with different network nodes of a same cell.

Referring back to FIGS. 3 and 4, in one exemplary embodiment of a UE, the device 300 includes a program code 312 stored in the memory 310. The CPU 308 could execute program code 312 to enable the UE to maintain at least a first timing advance value and a second timing advance value, wherein the first timing advance value and the second timing advance value are associated with different network nodes of a same cell. Furthermore, the CPU 308 can execute the program code 312 to perform all of the above-described actions and steps or others described herein.

In one embodiment, the first timing advance value being associated with a network node means that the UE applies the first timing advance value to adjust timing of UL transmission for the network node.

Figure 31B:
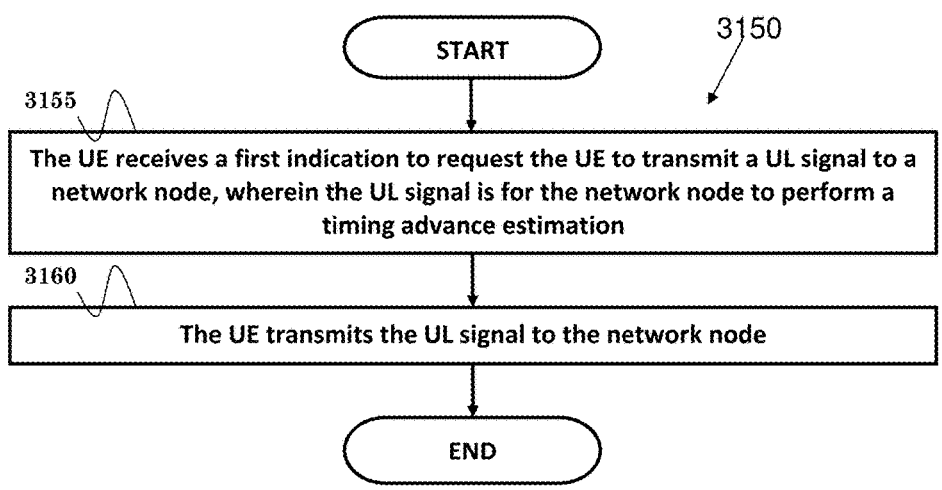
FIG. 31B is a flow chart according to one exemplary embodiment.

FIG. 31B is a flow chart 3150 according to one exemplary embodiment from the perspective of a UE. In step 3155, the UE receives a first indication to request the UE to transmit a UL signal to a network node, wherein the UL signal is for the network node to perform a timing advance estimation. In step 3160, the UE transmits the UL signal to the network node.

Referring back to FIGS. 3 and 4, in one exemplary embodiment of a UE, the device 300 includes a program code 312 stored in the memory 310. The CPU 308 could execute program code 312 to enable the UE (i) to receive a first indication to request the UE to transmit a UL signal to a network node, wherein the UL signal is for the network node to perform a timing advance estimation, and (ii) to transmit the UL signal to the network node. Furthermore, the CPU 308 can execute the program code 312 to perform all of the above-described actions and steps or others described herein.

In one embodiment, the UE could start a timer to control a retransmission of the UL signal when the UE transmits the UL signal. The UE could start a timer to control a retransmission of the UL signal to avoid the network node receiving the UL signal unsuccessfully. The timer could be configured by RRC.

In one embodiment, the UE could perform a retransmission of the UL signal with power ramping when a condition is fulfilled. The retransmission with power ramping means that the UE ramps up power to retransmit the UL signal to the network node. The condition could be (i) the timer expires and the UE still not receives a response of the UL signal, wherein the response is a second indication, or (ii) the UE considers the UL signal is transmitted unsuccessfully. Power ramping related parameter(s) could be configured by RRC, e.g., amount and/or granularity of power ramping in each step.

Figure 32:
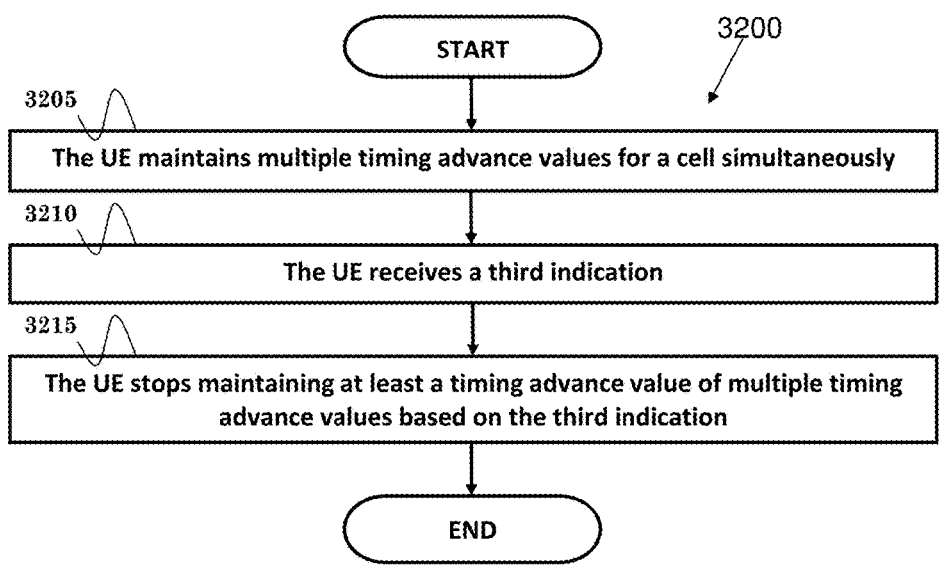
FIG. 32 is a flow chart according to one exemplary embodiment.

FIG. 32 is a flow chart 3200 according to one exemplary embodiment from the perspective of a UE. In step 3205, the UE maintains multiple timing advance values for a cell simultaneously. In step 3210, the UE receives a third indication. In step 3215, the UE stops maintaining at least a timing advance value of the multiple timing advance values based on the third indication.

Referring back to FIGS. 3 and 4, in one exemplary embodiment of a UE, the device 300 includes a program code 312 stored in the memory 310. The CPU 308 could execute program code 312 to enable the UE (i) to maintain multiple timing advance values for a cell simultaneously, (ii) to receive a third indication, and (iii) to stop maintaining at least a timing advance value of the multiple timing advance values based on the third indication. Furthermore, the CPU 308 can execute the program code 312 to perform all of the above-described actions and steps or others described herein.

In one embodiment, the first indication could indicate a resource (UL grant) for the UL signal. The resource (UL grant) could be periodic or aperiodic. The first indication could indicate a parameter associated with a preamble, e.g., preamble sequence or time/frequency resources used to transmit the preamble. The first indication could indicate a power control information, wherein the power control information is related to transmission power of the UL signal. The first indication could indicate a timing advance index, wherein the timing advance index is to indicate which associated timing advance value is to be added and/or estimated. The first indication could indicate a UE beam information, wherein the UE beam information is for the UE to decide which UE beam(s) is used to transmit the UL signal, e.g., identifier of the network node or the UE beam(s). The first indication could indicate a network beam information, wherein the network beam information could be a network beam identifier or a receiving time of the network beam(s).

In one embodiment, the first indication could be a physical layer control signaling or a MAC layer control signaling.

In one embodiment, the second indication could include a timing advance index to indicate which associated timing advance value would be added or modified. The second indication could include a resource for UL transmission, wherein the resources are for the UE to transmit a specific signal, e.g., the confirmation, PHR (Power Headroom Report), and/or BSR (Buffer Status Report).

In one embodiment, the second indication could be scrambled by a UE identifier. The second indication may not include a UE identifier, wherein the UE identifier is, e.g., C-RNTI (Cell Radio Network Temporary Identifier) or Temporary C-RNTI. The second indication may not include a preamble identifier, wherein the preamble identifier is, e.g., RAPID (Random Access Preamble Identifier).

In one embodiment, the second indication could be a physical layer control signaling or a MAC layer control signaling.

In one embodiment, the third indication could comprise at least a timing advance index (e.g., expressed by index list or bitmap). The third indication could be a physical layer control signaling or a MAC layer control signaling.

In one embodiment, the UE stops maintaining the timing advance value means that the UE considers the timing advance value is not feasible to utilize for a UL transmission. When the UE stops maintaining the timing advance value, the UE could (i) stop a UL transmission via beam(s) associated with the timing advance value, and/or (ii) stop a timing advance timer associated the timing advance value. When the UE stops maintaining the timing advance value, the UE may not flush a UL buffer, wherein the UL buffer is, e.g., UL HARQ (Hybrid Automatic Repeat ReQuest) buffer. When the UE stops maintaining the timing advance value, the UE does not release RRC configuration, e.g., for PUCCH, SRS or UL reference signal.

In one embodiment, when the UE stops maintaining the timing advance value, the UE releases semi-persistent scheduled resource(s).

In one embodiment, the UL transmission comprises a signal for data transmission or a reference signal.

In one embodiment, network nodes of a cell could be grouped into different sets, wherein the UE uses the same timing advance value for UL transmissions to the same set.

In one embodiment, the UE could be able to maintain multiple timing advance values simultaneously. Maintaining a timing advance value means that the UE could apply the timing advance value to adjust timing of UL transmission. The UE could maintain different timing advance values for different network nodes or for different groups of network nodes.

In one embodiment, timing advance estimation means that the network node estimates the UL signal arrival time which can be used to calculate the required timing advance value and adjust the UL transmission timing.

In one embodiment, some or all of the first indication, the second indication and the third indication could be carried by the same signal.

In one embodiment, the UL signal could comprise a reference signal. The reference signal could include one or multiple of the following signals: cell-specific reference signal, MBSFN reference signal, UE-specific reference signal, positioning reference signal, CSI reference signal, discovery signal, and beam specific reference signal.

In one embodiment, the UL signal could be transmitted periodically or aperiodically. The UE could transmit the UL signal via UE beam sweeping.

In one embodiment, the cell could comprise of one network node or multiple network nodes. The network node could be a central unit (CU), a distributed unit (DU), a transmission/reception point (TRP), a base station (BS), a 5G node, or a gNB. The network node could be associated with a cell comprising multiple network nodes.

In one embodiment, the UE could be capable of using UE beamforming. The UE does not use UE beamforming if the cell doesn't support (or allow) UE beamforming. The UE could use beam sweeping for transmission and/or reception. Alternatively, the UE does not use beam sweeping for transmission and/or reception. The UE could be in connected state (or connected mode).

Based on the invention, accurate timing alignment can be achieved for uplink transmissions in a cell comprising multiple TRPs or requiring multiple timing advance values. The invention can let UE be capable of maintaining multiple timing advance values associated with multiple network nodes in a cell simultaneously. Unnecessary waste of some resources (e.g., resources for UL data transmission or UL reference signals) can be reduced. Procedure to acquire timing advance value with absolute value can be improved.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE), comprising:
   maintaining a first timing advance value for uplink transmissions;
   receiving a signaling, via a downlink control channel, to schedule a first uplink transmission in a cell, wherein the signaling includes a first information to assist the UE to determine a specific timing advance value for the first uplink transmission, and the first information indicates an index value used to control an offset value to be applied to the first timing advance value;
   determining, by the UE, the specific timing advance value based on the first information and the first timing advance value; and
   performing the first uplink transmission in the cell at transmission timing determined at least based on the specific timing advance value.

2. The method of claim 1, wherein the UE updates the first timing advance value at least based on the first information.

3. The method of claim 2, wherein the UE uses the updated first timing advance value for the first uplink transmission.

4. The method of claim 1, wherein the first information does not affect uplink transmissions following the first transmission.

5. The method of claim 1, wherein the signaling includes a second information which assists the UE to determine which maintained timing advance value to be used for the first uplink transmission.

6. The method of claim 1, wherein the downlink control channel is a Physical Downlink Control Channel (PDCCH).

7. The method of claim 1, wherein the UE maintains a single timing advance value for the cell.

8. A User Equipment (UE), comprising:
   a control circuit;
   a processor installed in the control circuit; and
   a memory installed in the control circuit and operatively coupled to the processor;
   wherein the processor is configured to execute a program code stored in the memory to:
      maintain a first timing advance value for uplink transmissions;
      receive a signaling, via a downlink control channel, to schedule a first uplink transmission in a cell, wherein the signaling includes a first information to assist the UE to determine a specific timing advance value for the first uplink transmission, and the first information indicates an index value used to control an offset value to be applied to the first timing advance value;
      determine, by the UE, the specific timing advance value based on the first information and the first timing advance value; and
      perform the first uplink transmission in the cell at transmission timing determined at least based on the specific timing advance value.

9. The UE of claim 8, wherein the UE updates the first timing advance value at least based on the first information.

10. The UE of claim 8, wherein the first information does not affect uplink transmissions following the first transmission.

11. The UE of claim 8, wherein the signaling includes a second information which assists the UE to determine which maintained timing advance value to be used for the first uplink transmission.

12. The UE of claim 8, wherein the downlink control channel is a Physical Downlink Control Channel (PDCCH).

13. The UE of claim 8, wherein the UE maintains a single timing advance value for the cell.

14. The UE of claim 9, wherein the UE uses the updated first timing advance value for the first uplink transmission.

15. The UE of claim 8, wherein the UE does not update the first timing advance value based on the first information.

16. The UE of claim 11, wherein the second information is an index of the maintained timing advance value.

17. The UE of claim 11, wherein the second information indicates a Transmission/Reception Point (TRP), a group of TRPs, a network beam, and/or a group of network beams associated with the maintained timing advance value to be used for the first uplink transmission.

18. The method of claim 1, wherein the UE does not update the first timing advance value based on the first information.

19. The method of claim 5, wherein the second information is an index of the maintained timing advance value.

20. The method of claim 5, wherein the second information indicates a Transmission/Reception Point (TRP), a group of TRPs, a network beam, and/or a group of network beams, associated with the maintained timing advance value to be used for the first uplink transmission.

* * * * *